(12) United States Patent
Hull et al.

(10) Patent No.: US 8,851,135 B2
(45) Date of Patent: *Oct. 7, 2014

(54) METHOD OF CUSTOMIZING AN ARTICLE AND APPARATUS

(71) Applicant: Nike, Inc., Beaverton, OR (US)

(72) Inventors: N. Scot Hull, Vancouver, WA (US); Elizabeth Langvin, Sherwood, OR (US)

(73) Assignee: NIKE, Inc., Beaverton, OR (US)

( * ) Notice: Subject to any disclaimer, the term of this patent is extended or adjusted under 35 U.S.C. 154(b) by 29 days.

This patent is subject to a terminal disclaimer.

(21) Appl. No.: 13/622,552

(22) Filed: Sep. 19, 2012

(65) Prior Publication Data

US 2013/0014900 A1    Jan. 17, 2013

Related U.S. Application Data

(60) Continuation of application No. 13/352,717, filed on Jan. 18, 2012, now Pat. No. 8,293,054, which is a division of application No. 12/245,402, filed on Oct. 3, 2008, now Pat. No. 8,162,022.

(51) Int. Cl.
| | |
|---|---|
| B32B 37/00 | (2006.01) |
| A43D 95/14 | (2006.01) |
| A43D 999/00 | (2006.01) |
| B44C 1/10 | (2006.01) |
| B44C 1/17 | (2006.01) |

(52) U.S. Cl.
CPC ............ *A43D 95/14* (2013.01); *A43D 999/00* (2013.01); *B44C 1/105* (2013.01); *B44C 1/17* (2013.01); *B44C 1/1712* (2013.01)

USPC ...................... 156/382; 156/583.1; 156/583.3

(58) Field of Classification Search
USPC ................. 156/285, 356, 358, 381, 382, 580, 156/583.1, 583.3; 425/383, 384, 389, 390
See application file for complete search history.

(56) References Cited

U.S. PATENT DOCUMENTS

| | | | |
|---|---|---|---|
| 1,893,795 | A | 1/1933 | Chapman |
| 1,970,600 | A | 8/1934 | Frost |
| 2,182,022 | A | 12/1939 | Griswold |

(Continued)

FOREIGN PATENT DOCUMENTS

| | | |
|---|---|---|
| EP | 0264898 | 4/1988 |
| EP | 1000731 | 5/2000 |

(Continued)

OTHER PUBLICATIONS

Invitation to Pay Additional Fees mailed Jan. 28, 2010, with Annex containing results of International Search from PCT Application No. PCT/US2009/059018.

(Continued)

*Primary Examiner* — James Sells
(74) *Attorney, Agent, or Firm* — Plumsea Law Group, LLC

(57) ABSTRACT

A method of applying graphics to a set of articles with a graphic transfer assembly is disclosed. The method includes a step of selecting an article from a set of articles comprising different types of articles. After selecting a last that may be associated with the article, the last may be attached to a last assembly of the graphic transfer assembly. With the article attached to the graphic transfer assembly, a deformable membrane may apply graphics to curved portions of the article.

20 Claims, 35 Drawing Sheets

(56) References Cited

U.S. PATENT DOCUMENTS

| | | |
|---|---|---|
| 2,466,598 A | 4/1949 | Civita |
| 2,537,785 A | 1/1951 | Oppenheim |
| 2,647,337 A | 8/1953 | Martin |
| 2,651,119 A | 9/1953 | Harrington |
| 2,651,857 A | 9/1953 | Griswold et al. |
| 3,362,091 A | 1/1968 | Drago |
| 3,483,580 A | 12/1969 | Cherry et al. |
| 3,803,655 A | 4/1974 | White et al. |
| 4,078,962 A | 3/1978 | Krueger |
| 4,188,254 A | 2/1980 | Hemperly, Jr. |
| 4,247,355 A | 1/1981 | Friedrick et al. |
| 4,266,312 A | 5/1981 | Hall |
| 4,505,975 A | 3/1985 | Majima |
| 4,660,242 A | 4/1987 | Vornberger et al. |
| 4,670,084 A | 6/1987 | Durand |
| 4,724,026 A | 2/1988 | Nelson |
| 4,792,376 A | 12/1988 | Denley |
| 4,888,713 A | 12/1989 | Falk |
| 4,899,411 A | 2/1990 | Johnson et al. |
| 4,964,229 A | 10/1990 | Laberge |
| 5,087,495 A | 2/1992 | Nelson |
| 5,097,390 A | 3/1992 | Gerrie et al. |
| 5,255,352 A | 10/1993 | Falk |
| 5,296,182 A | 3/1994 | Thary |
| 5,341,532 A | 8/1994 | Markowitz |
| 5,414,975 A | 5/1995 | Hummel |
| 5,464,337 A | 11/1995 | Bernardon et al. |
| 5,477,577 A | 12/1995 | Hadley |
| 5,486,397 A | 1/1996 | Gordon et al. |
| 5,511,608 A | 4/1996 | Boyd |
| 5,885,500 A | 3/1999 | Tawney et al. |
| 5,893,964 A | 4/1999 | Claveau |
| 5,962,368 A | 10/1999 | Poole |
| 5,985,416 A | 11/1999 | Sherman et al. |
| 5,994,264 A | 11/1999 | Sherman et al. |
| 6,295,679 B1 | 10/2001 | Chenevert |
| 6,299,817 B1 | 10/2001 | Parkinson |
| 6,485,668 B1 | 11/2002 | Murphy et al. |
| 6,544,634 B1 | 4/2003 | Abrams et al. |
| 6,670,029 B2 | 12/2003 | Norton et al. |
| 6,718,880 B2 | 4/2004 | Oshima et al. |
| 6,855,171 B2 | 2/2005 | Morlacchi |
| 6,971,135 B2 | 12/2005 | Nadler |
| 6,984,281 B2 | 1/2006 | Oshima et al. |
| 6,994,765 B2 | 2/2006 | Oshima et al. |
| 7,013,580 B2 | 3/2006 | Morlacchi |
| 7,166,249 B2 | 1/2007 | Abrams et al. |
| 7,563,341 B2 | 7/2009 | Ferguson et al. |
| 7,950,432 B2 | 5/2011 | Langvin et al. |
| 8,162,022 B2 | 4/2012 | Hull et al. |
| 8,293,054 B2 * | 10/2012 | Hull et al. .............. 156/230 |
| 2002/0023306 A1 | 2/2002 | Sajedi et al. |
| 2003/0046778 A1 | 3/2003 | Sicurelli, Jr. |
| 2003/0115679 A1 | 6/2003 | Morlacchi et al. |
| 2006/0005328 A1 | 1/2006 | Johnson |
| 2006/0024455 A1 | 2/2006 | Oshima et al. |
| 2006/0123567 A1 | 6/2006 | Morlacchi |
| 2007/0039682 A1 | 2/2007 | Drake et al. |
| 2007/0079928 A1 | 4/2007 | Abrams et al. |
| 2007/0130805 A1 | 6/2007 | Brady et al. |
| 2007/0151656 A1 | 7/2007 | Gager et al. |
| 2007/0185372 A1 | 8/2007 | Anderson et al. |
| 2008/0028544 A1 | 2/2008 | Park |
| 2008/0127426 A1 | 6/2008 | Morlacchi et al. |
| 2008/0141469 A1 | 6/2008 | Park |
| 2008/0250668 A1 | 10/2008 | Marvin et al. |
| 2010/0084083 A1 | 4/2010 | Hull et al. |
| 2010/0139853 A1 | 6/2010 | Park |
| 2010/0275393 A1 | 11/2010 | Jou et al. |
| 2010/0326591 A1 | 12/2010 | Langvin et al. |
| 2011/0088282 A1 | 4/2011 | Dojan et al. |
| 2012/0111487 A1 | 5/2012 | Hull et al. |

FOREIGN PATENT DOCUMENTS

| | | |
|---|---|---|
| EP | 1635665 | 3/2006 |
| FR | 988355 | 8/1951 |
| JP | 9207149 | 8/1997 |
| JP | 2004105323 | 4/2004 |
| WO | 9003744 | 4/1990 |
| WO | 9008487 | 8/1990 |
| WO | 9629208 | 9/1996 |
| WO | 02072301 | 9/2002 |
| WO | 02094581 | 11/2002 |
| WO | 2004112525 | 12/2004 |
| WO | 2006095375 | 9/2006 |
| WO | 2007007369 | 1/2007 |
| WO | 2010039826 | 4/2010 |
| WO | 2011082275 | 7/2011 |

OTHER PUBLICATIONS

International Search Report mailed Jul. 11, 2002 from PCT Application No. PCT/US2002/07617.

International Search Report and Written Opinion mailed Apr. 20, 2010 in PCT Application No. PCT/US2009/059018.

International Preliminary Report on Patentability (including Written Opinion of the ISA) mailed Apr. 14, 2011 in International Application No. PCT/US2009/059018.

International Search Report mailed Oct. 4, 2011 in PCT Application No. PCT/US2010/039306.

International Preliminary Report on Patentability (including Written Opinion of the ISA) mailed Jan. 12, 2012 in International Application No. PCT/US2010/039306.

* cited by examiner

METHOD OF CUSTOMIZING AN ARTICLE AND APPARATUS

CROSS-REFERENCE TO RELATED APPLICATIONS

This application is a continuation of U.S. application Ser. No. 13/352,717 now U.S. Pat. No. 8,293,054, entitled "Method of Customizing an Article and Apparatus", filed on Jan. 18, 2012 and allowed on Jun. 21, 2012, which application is a division of U.S. application Ser. No. 12/245,402, entitled "Method of Customizing an Article and Apparatus", filed on Oct. 3, 2008 and issued as U.S. Pat. No. 8,162,022 on Apr. 24, 2012, which applications are hereby incorporated by reference in their entirety.

BACKGROUND

The present invention relates to a method of making articles, and in particular to a method of applying graphics to an article.

Methods of customizing an article of footwear have been previously proposed. Abrams et al. (U.S. Pat. No. 7,166,249) is directed to an in-mold decorating process. Abrams teaches a method of applying a sheet with a printed graphic to a mold in order to create a molded product that includes the printed graphic. Abrams teaches a method that allows for the in-mold decoration of deep dimensional and three dimensional molded parts.

Abrams teaches an embodiment for applying an image to a molded duck decoy. First, left and right photographic images of the duck are produced using distortion printing to compress the image in designated areas. The sheet is then coated using screen printing techniques. The printed and coated sheet is then vacuum formed to the dimensions of a duck decoy causing the distortion printed areas to assume normal color and proportion. The vacuum formed printed sheet is cut into left and right view pieces which are then placed in the appropriate cavities of a blow mold and molded with polyethylene. When the mold is opened two halves of a duck decoy having a photographic quality image are removed and mated to form a finished decoy.

SUMMARY

A method of customizing an article is disclosed. In one aspect, the invention comprises a method of applying a graphic to an article, comprising the steps of: associating the graphic with a curved surface of the article; pressing a deformable membrane against a portion of the article so that the deformable membrane conforms to the curved surface; heating the deformable membrane; and thereby transferring the graphic to the curved surface.

In another aspect, the graphic is associated with the curved surface using an adhesive.

In another aspect, the deformable membrane comprises a fabric material.

In another aspect, the deformable membrane is a heat conducting material.

In another aspect, the step of pressing the deformable membrane against the portion of the article includes a step of applying a vacuum between the deformable membrane and the curved surface.

In another aspect, the deformable membrane is associated with a graphic transfer assembly further comprising an outer portion and an inner portion and wherein the deformable membrane is disposed between the outer portion and the inner portion.

In another aspect, the outer portion and the inner portion are made of a material including silicone.

In another aspect, the deformable membrane is associated with a graphic transfer assembly, and wherein the graphic transfer assembly further comprises: a housing portion configured to support the deformable membrane; a set of heating elements; and a plenum filled with a heat conducting fluid, the plenum being disposed between the deformable membrane and the set of heating elements.

In another aspect, the deformable membrane is a high temperature rubber bladder.

In another aspect, the invention provides a method of using a graphic transfer assembly, comprising the steps of: selecting an article from a set of articles, the set of articles comprising at least two different types of articles; selecting a last from a set of lasts according to the size and shape of the article and associating the last with a last assembly of the graphic transfer assembly; associating the article with the last assembly; and transferring a graphic to a curved portion of the article using the graphic transfer assembly.

In another aspect, the graphic transfer assembly includes a deformable membrane that is configured to conform to a curved portion of the article.

In another aspect, the graphic transfer assembly includes two deformable membranes that are configured to conform to opposing sides of the article and thereby conform to the shape of the entire article.

In another aspect, the invention provides a graphic transfer assembly, comprising: a base portion configured to support the graphic transfer assembly; a first moveable portion including a first deformable membrane and a second moveable portion including a second deformable membrane; a last assembly configured to attach a last to the base portion; an actuator configured to control the first moveable portion and the second moveable portion; and wherein the first deformable membrane and the second deformable membrane are configured to conform to a curved portion of an article and thereby transfer a graphic to the curved portion.

In another aspect, the first moveable portion comprises a frame configured to support the first deformable membrane.

In another aspect, the second moveable portion comprises a frame configured to support the second deformable membrane.

In another aspect, the graphic transfer assembly includes a valve that is configured to apply a vacuum between the first deformable membrane and the second deformable membrane.

In another aspect, the first moveable portion and the second moveable portion include at least one seal for substantially reducing air from entering between the first moveable portion and the second moveable portion.

In another aspect, the first deformable membrane and the second deformable membrane comprise a heat conducting material.

In another aspect, the first deformable membrane and the second deformable membrane are configured to conform to a substantial majority of the article.

In another aspect, the last is selected according to the shape and size of the article.

Other systems, methods, features and advantages of the invention will be, or will become apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
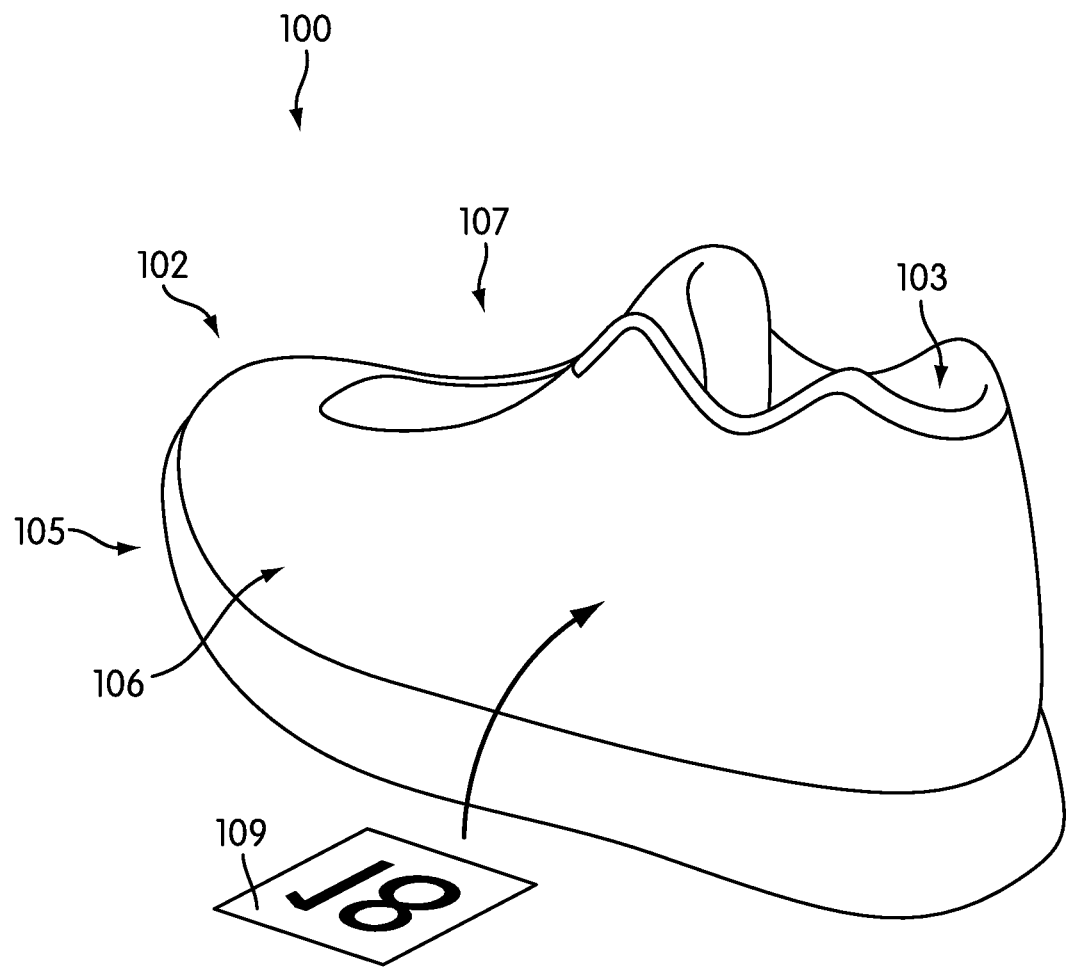
FIG. 1 is an isometric view of an embodiment of an article.
Figure 2:
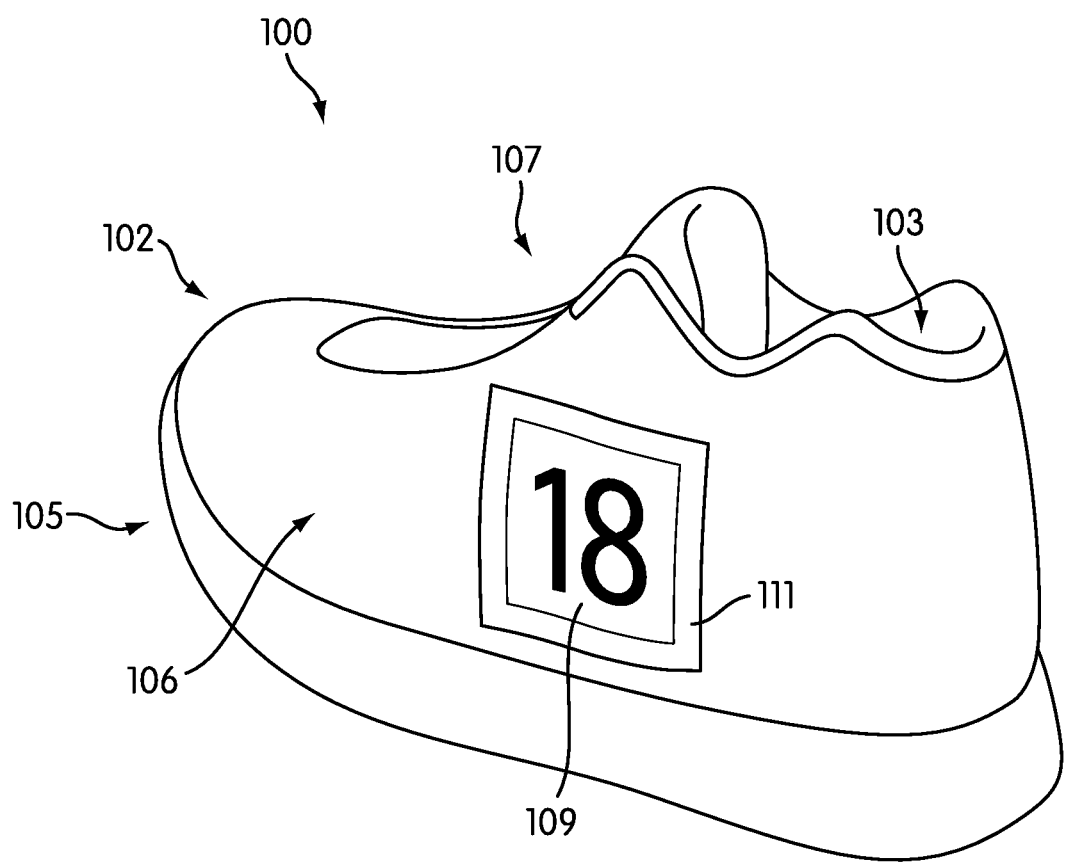
FIG. 2 is an isometric view of an embodiment of an article with an associated graphic.

FIGS. 1 and 2 are schematic views of an embodiment of article 100 that is configured to be worn. In this exemplary embodiment, article 100 is an article of footwear. However, it should be understood that the principles taught throughout this detailed description may be applied to additional articles as well. Generally, these principles could be applied to any article that may be worn. In some embodiments, the article may include one or more articulated portions that are configured to move. In other cases, the article may be configured to conform to portions of a wearer in a three-dimensional manner. Examples of articles that are configured to be worn include, but are not limited to: footwear, gloves, shirts, pants, socks, scarves, hats, jackets, as well as other articles. Other examples of articles include, but are not limited to: shin guards, knee pads, elbow pads, shoulder pads, as well as any other type of protective equipment. Additionally, in some embodiments, the article could be another type of article that is not configured to be worn, including, but not limited to: balls, bags, purses, backpacks, as well as other articles that may not be worn.

In one exemplary embodiment, article 100 may be a high top shoe. However, in other embodiments, article 100 could be any type of footwear, including, but not limited to: a running shoe, a basketball shoe, a high heel shoe, a boot, a slip-on shoe, a low top shoe, as well as other types of footwear. Additionally, while a single article of footwear is shown in the current embodiment, the same principles taught in this detailed description could be applied to a second, complementary article of footwear.

In different embodiments, article 100 may comprise different portions. In this embodiment, article 100 includes upper 102. Generally, upper 102 may be any type of upper. In particular, upper 102 may comprise an upper with any design, shape, size and/or color. For example, in embodiments where article 102 is a basketball shoe, article 102 could comprise a high top upper that is shaped to provide high support on an ankle. In embodiments where article 102 is a running shoe, article 102 could comprise a low top upper that is shaped to provide flexibility during running.

Article 100 is configured to receive a foot of a wearer. In some embodiments, article 100 includes throat 103 configured to receive a foot of a wearer. Typically, throat 103 allows a foot to be inserted into an interior portion of article 100.

Article 100 may include lateral portion 106. Also, article 100 may include medial portion 107 disposed opposite lateral portion 106. Furthermore, lateral portion 106 may be associated with an outside of a foot. Similarly, medial portion 107 may be associated with an inside of a foot.

In some embodiments, article 100 could further be associated with a sole system. In some cases, a sole system for article 100 could include an outsole. In other cases, the sole system could include a midsole. In still other cases, the sole system could include an insole. In an exemplary embodiment, article 100 may include sole system 105. Sole system 105 may include a midsole and an outsole.

Referring to FIGS. 1 and 2, one or more graphics may be applied to portions of article 100. The term "graphic" as used throughout this detailed description and in the claims, applies to any image, picture, text or indicia. In some cases, a graphic may be used for decorative purposes. In other cases, a graphic may be used for displaying various types of information. In still other cases, a graphic may include the application of a color to a portion or a substantial entirety of an article. In some cases, a single solid color could be applied to a portion or a substantial entirety of an article. In other cases, multiple colors could be applied in various manners to a portion or a substantial entirety of an article. Furthermore, in still other cases, a graphic could include a combination of images, colors and other types of designs. For example, in this embodiment, graphic 109 may be associated with article 100.

Generally, a graphic may be configured with any size and shape, including, but not limited to: square shapes, rectangular shapes, elliptical shapes, triangular shapes, regular shapes, irregular shapes as well as other types of shapes. In some cases, a graphic may be three dimensional. In other cases, a graphic may be substantially two dimensional. In one embodiment, graphic 109 is configured with a generally rectangular shape. In addition, graphic 109 is substantially two dimensional. In other words, graphic 109 is relatively flat. Furthermore, in an exemplary embodiment, graphic 109 may be used to indicate a team number of an athlete wearing article 100. For example, in one embodiment, graphic 109 may include the number "18".

In different embodiments, a graphic may be applied using various methods. In one embodiment, a graphic may be printed onto a film that is compatible with an upper material. In particular, the graphic may be printed onto the film in reverse so that the graphic ink contacts the upper material. With this arrangement, the ink is protected by the film. In some cases, the film may be a film that is compatible with a polyurethane (PU) coating on an upper. In other embodiments, however, other methods for applying a graphic to an article may be used.

In different embodiments, one or more graphics may be applied to different portions of article 100. For example, in this embodiment, graphic 109 may be applied to lateral portion 106 of article 100. In some cases, additional graphics may be applied to other portions of article 100.

In some embodiments, a graphic may be applied to a curved portion of an article. For example, an article of footwear may comprise curved portions including, but not limited to: toe portions, heel portions, lacing portions, and sides of an article of footwear. In other embodiments, a graphic may be applied to a substantially flat portion of an article.

In one embodiment, article 100 is substantially complete with portions of upper 102 and sole system 105 assembled to form article 100. With article 100 substantially assembled, lateral portion 106 comprises a curved portion of article 100. In particular, lateral portion 106 may be curved to conform to a portion of a foot that may be inserted within article 100.

In some embodiments, a graphic may be associated with a portion of an article prior to applying the graphic to the article. In some cases, a graphic may be temporarily attached to an article to associate the graphic with the article. In different embodiments, the temporary attachment of a graphic to an article may be accomplished in various manners, including, but not limited to: tape, adhesive and other manners known in the art. In one embodiment, a temporary tape with low adhesion is used to temporarily attach a graphic to an article. For example, in some cases, a frisket-type adhesive may be used. In one embodiment, a mylar tape can be used.

Referring to FIG. 1, graphic 109 may be associated with lateral portion 106 to indicate the position that graphic 109 may be applied to lateral portion 106. In this embodiment, lateral portion 106 may be a curved portion of article 100. In other embodiments, however, lateral portion 106 could be a substantially flat portion of article 100. In an exemplary embodiment, graphic 109 maybe temporarily attached with tape 111 prior to the application of graphic 109 to article 100, as illustrated in FIG. 2. After associating graphic 109 with article 100, a graphic transfer assembly may be used to apply graphic 109 to article 100.

In some embodiments, graphics may be applied to a large portion of an article. In some cases, a graphic may be used to apply color to a portion or an entirety of an article of footwear. In addition, a graphic can be used to apply a design to a portion or entirety of an article of footwear. In other words, the use of a graphic is not limited to a localized region of an article.

Figure 3:
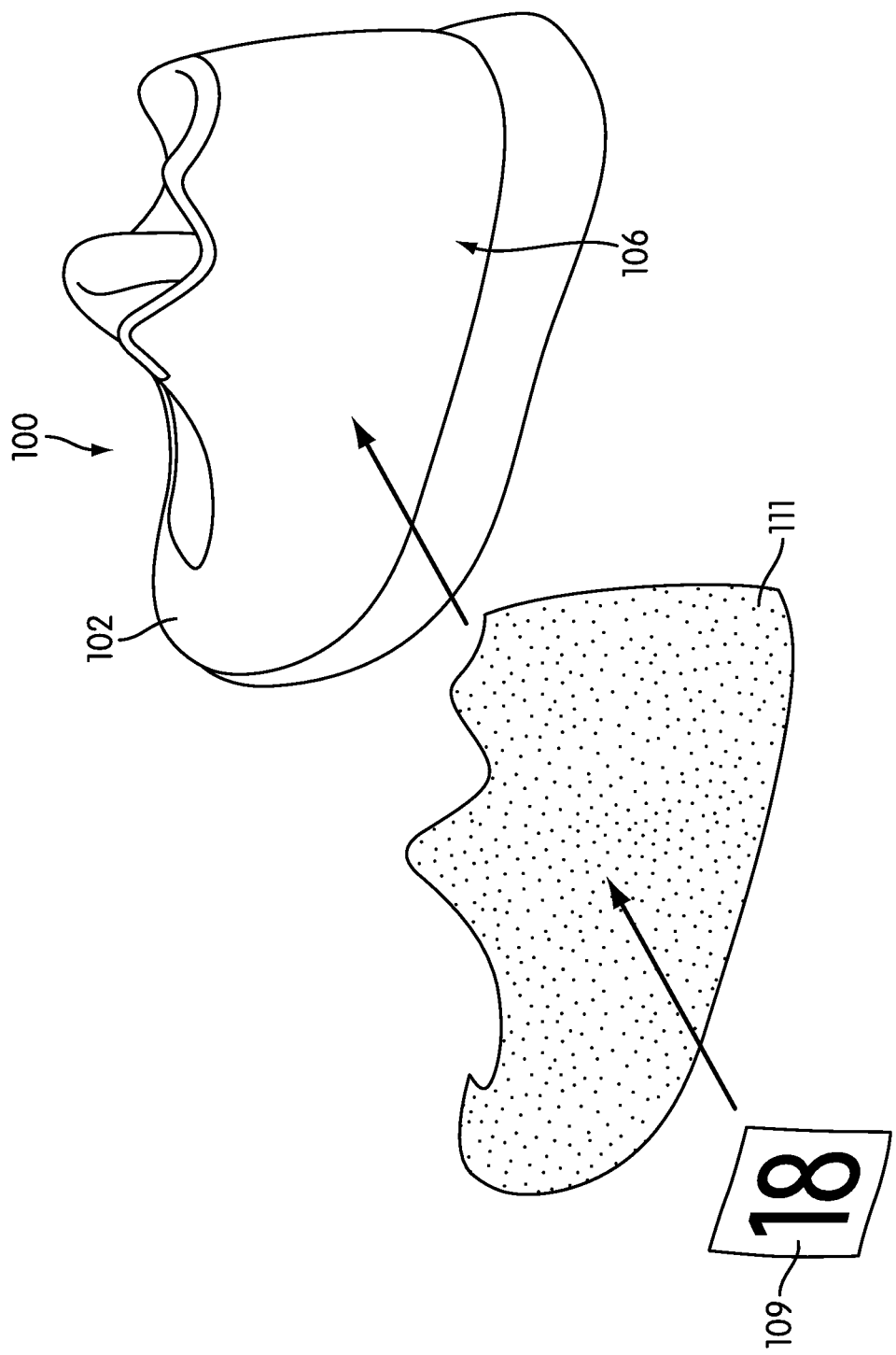
FIG. 3 is an isometric view of an embodiment of an article with an associated graphic.
Figure 4:
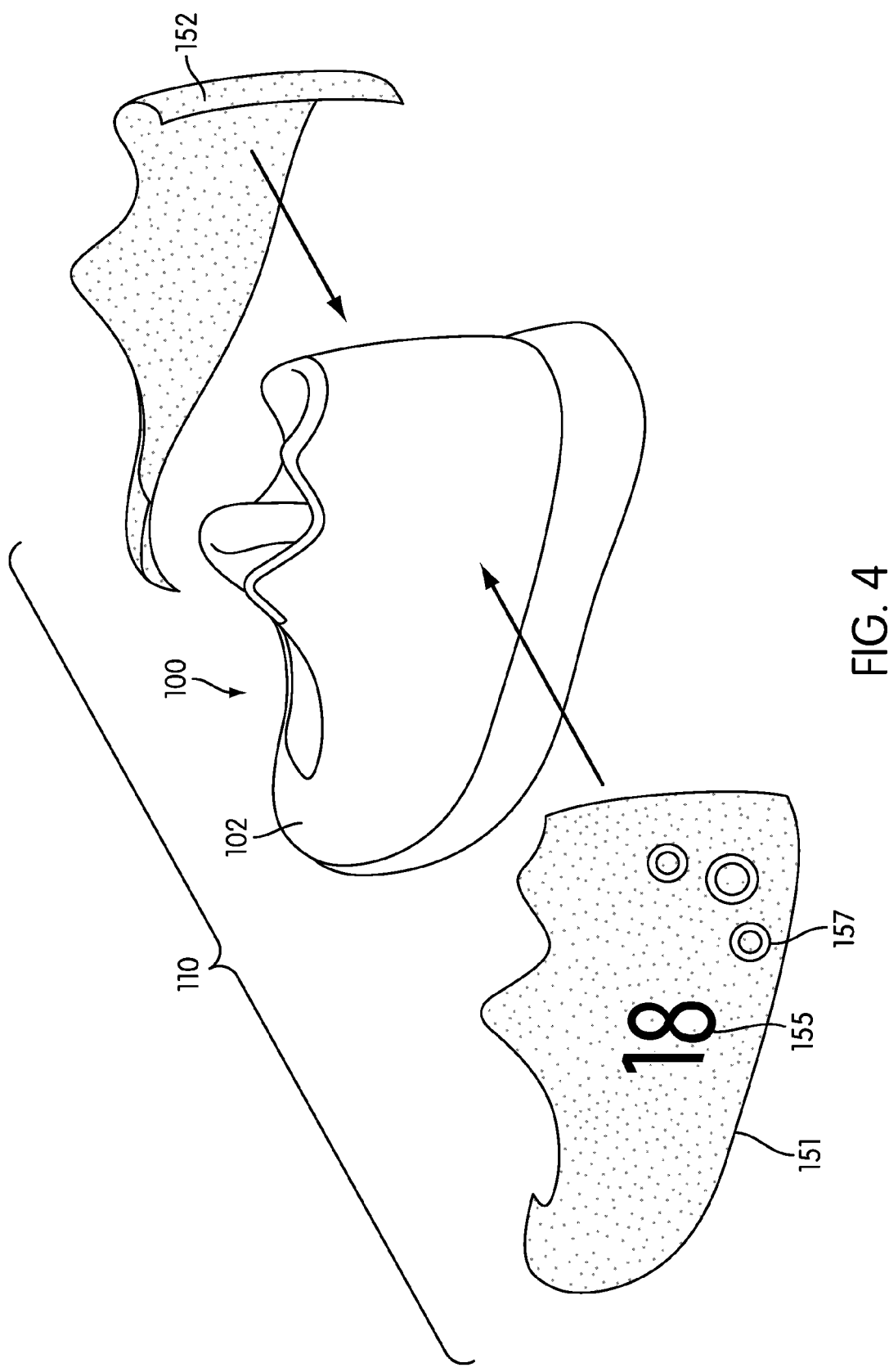
FIG. 4 is an isometric view of an embodiment of an article with an associated graphic.
Figure 5:
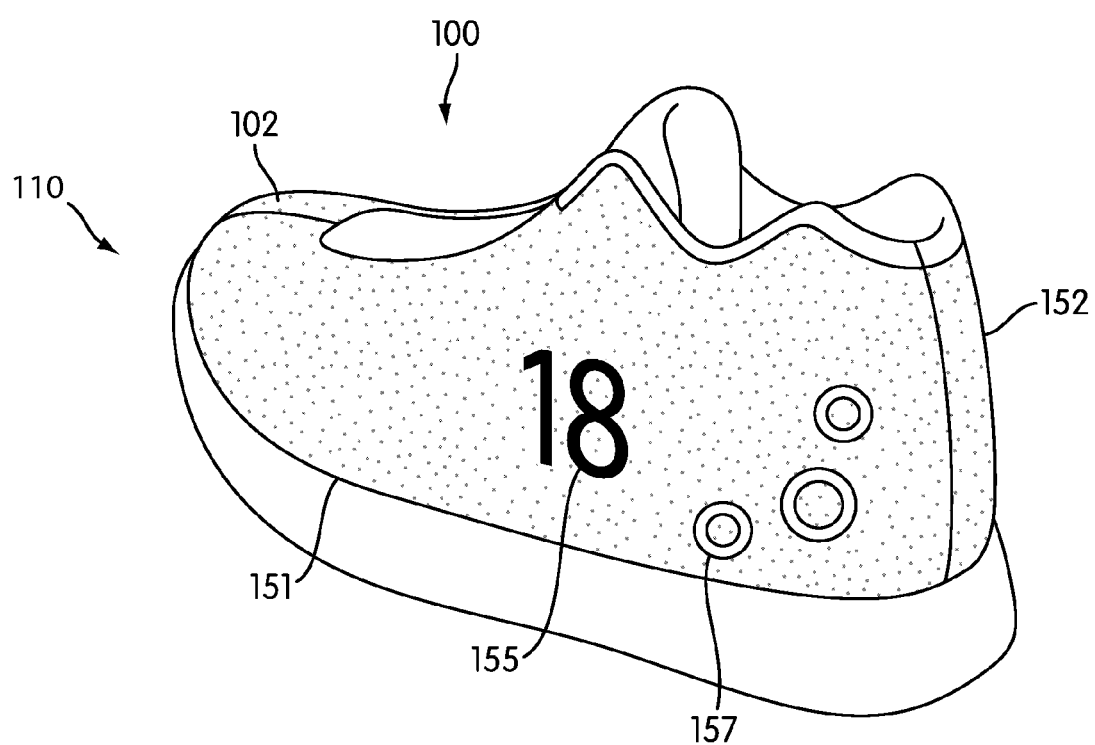
FIG. 5 is an isometric view of an embodiment of an article with an associated graphic.

FIGS. 3-5 illustrate different embodiments of graphics that may be applied to an article of footwear. Referring to FIG. 3, graphic 109 and coloring graphic 111 are applied to article of footwear 100. In some cases, coloring graphic 111 may be applied to lateral portion 106 of article 100 to provide color to the substantial entirety of lateral portion 106. In addition, graphic 109 can be applied directly to coloring graphic 111. In other words, in some cases, multiple graphics can be combined together to form a customized design for an article.

In different embodiments, coloring graphic 111 can be any material configured to cover a substantial majority of article of footwear 100. In some cases, for example, a coloring graphic can be a colored film. In other cases, a coloring graphic can be a thin coating of ink or dye that may be applied in another manner. In one embodiment, coloring graphic 111 may be a colored film that can be joined with lateral portion 106 to provide an overall change in color for upper 102.

Referring to FIGS. 4 and 5, graphic 110 comprises two distinct film portions. In particular, graphic 110 includes first film portion 151 and second film portion 152. In particular, first film portion 151 and second film portion 152 may be films with various inks or other dyes arranged as coloring for the article. In some cases, a film can also include inks and/or dyes arranged as a graphic or design. In this embodiment, first film portion 151 includes graphical number 155. In addition, first film portion 151 includes graphical design portion 157 that comprises a plurality of rings. In other cases, first film portion 151 could include any other combination of shapes, numbers, letters, or other types of images. In some cases, second film portion 152 can also include similar graphics and/or designs. With this arrangement, coloring, as well as distinct designs and patterns can be applied to article of footwear 100 using graphic 110.

In some cases, a customized graphic could be applied to an article. The term "customized graphic" refers to any graphic selected or created by a customer for application to one or more articles. In some cases, a customer may be provided with provisions for creating or selecting a customized graphic using a website associated with a manufacturer. In other cases, a customer can travel to a retail store or a kiosk to engage in a process of selecting or creating a customized graphic. In still other cases, a customer could submit a customized graphic to a manufacturer via mail or email. Examples of a customization process for creating and or selecting customized graphics that can be applied to an article can be found in U.S. Ser. No. 11/612,320, filed on Dec. 18, 2006, and hereby incorporated by reference. This case is hereby referred to as the "digital printing case".

FIGS. 6-15 are intended to illustrate an embodiment of a method of applying a graphic to an article with a graphic transfer assembly. For purposes of illustration, FIGS. 6-15 illustrate an embodiment of a method of applying graphic 110 to lateral portion 106 of article 100. However, it should be understood that this method could also be used to apply a graphic to any other portion of an article. For example, in embodiments where the article is an article of footwear, this method could be used to apply a graphic to another portion of an upper, a sole, as well as any other portions of the article. Furthermore, this method could be used to apply a graphic to individual portions of an article that could later be assembled together to form a completed article.

Figure 6:
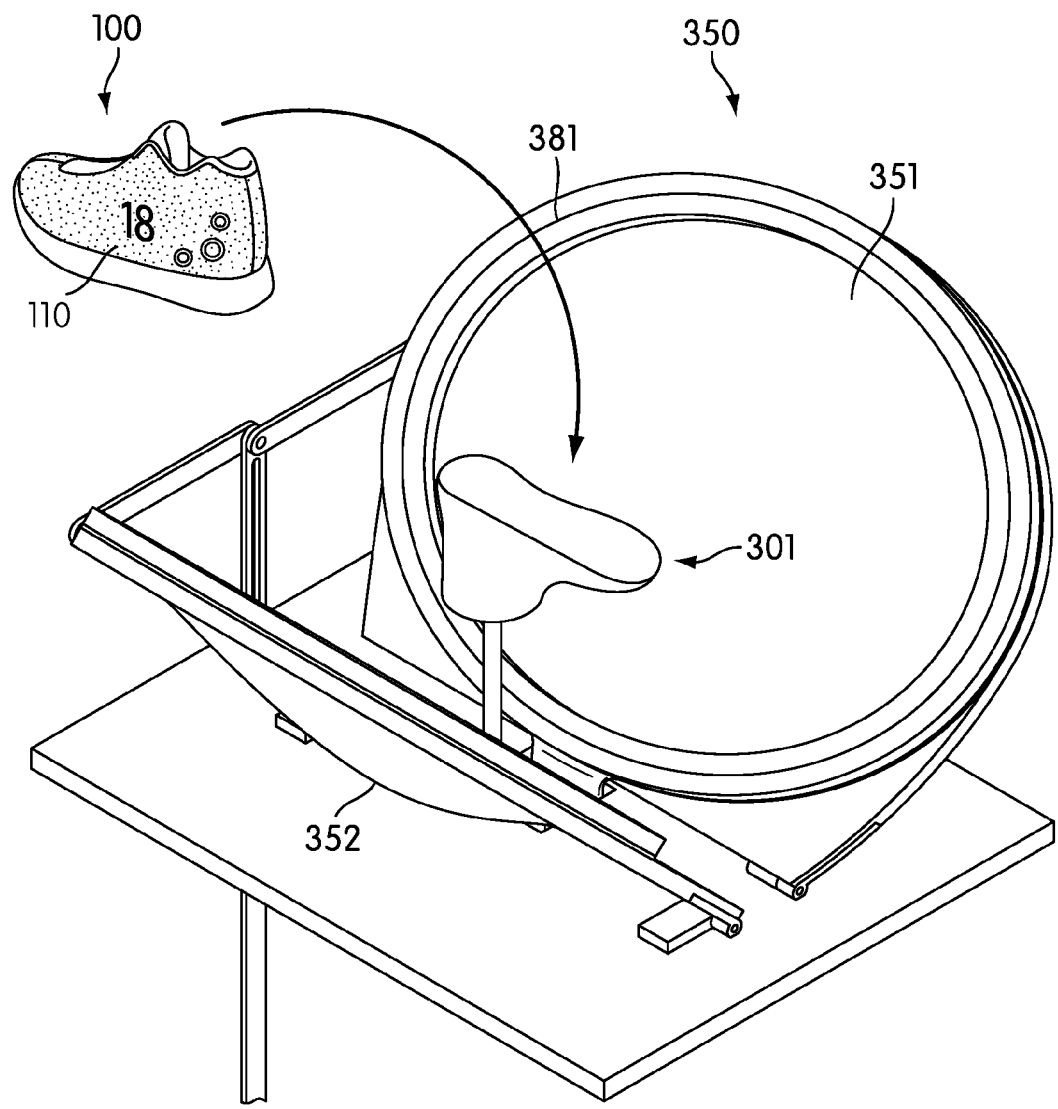
FIG. 6 is an isometric view of an embodiment of an article associated with a last attached to a graphic transfer assembly.

In some embodiments, an article may be associated with a last prior to the application of a graphic to the article. Referring to FIG. 6, last 301 may be inserted within article 100. With last 301 inserted within article 100, article 100 may be configured with a shape substantially similar to the shape that article 100 may assume during use of article 100. In order to apply graphic 110 to article 100, last 301 may be associated with graphic transfer assembly 350. Details of the attachment of last 301 to graphic transfer assembly 350 will be discussed in detail later in this detailed description.

A graphic transfer assembly may include provisions for applying a graphic to a curved portion of an article so that the graphic conforms to the curved portion. In other words, the graphic transfer assembly may be configured to apply the graphic to the curved portion of the article without wrinkles or bends in the curved portion of the article or the graphic. This may be accomplished by pressing the graphic into the various contours of the curved portion. In some cases, a graphic transfer assembly may include a deformable membrane that may be pressed against a curved portion of an article so that the deformable membrane conforms to the curved portion of the article.

In order to conform to a curved portion of an article, a deformable membrane may be constructed from a substantially flexible material. Examples of flexible material include, but are not limited to: natural rubber, synthetic rubber, silicone, other elastomers such as silicone rubber, as well as other materials known in the art. In one embodiment, a deformable membrane may comprise a fabric material.

In some embodiments, a graphic transfer assembly may include more than one deformable membrane. In an exemplary embodiment, graphic transfer assembly 350 includes two deformable membranes. In particular, graphic transfer assembly 350 includes first deformable membrane 351 and second deformable membrane 352.

Generally, a deformable membrane may be configured with any size and shape. Examples of shapes include, but are not limited to: square shapes, rectangular shapes, elliptical shapes, triangular shapes, regular shapes, irregular shapes as well as other types of shapes. In some embodiments, a deformable membrane may be configured with a size and shape to cover a substantial entirety of a portion of an article. For example, a deformable membrane may be configured with a size and shape to cover a medial portion of an article. In one embodiment, first deformable membrane 351 and second deformable membrane 352 may be configured with an oval shape.

Figure 7:
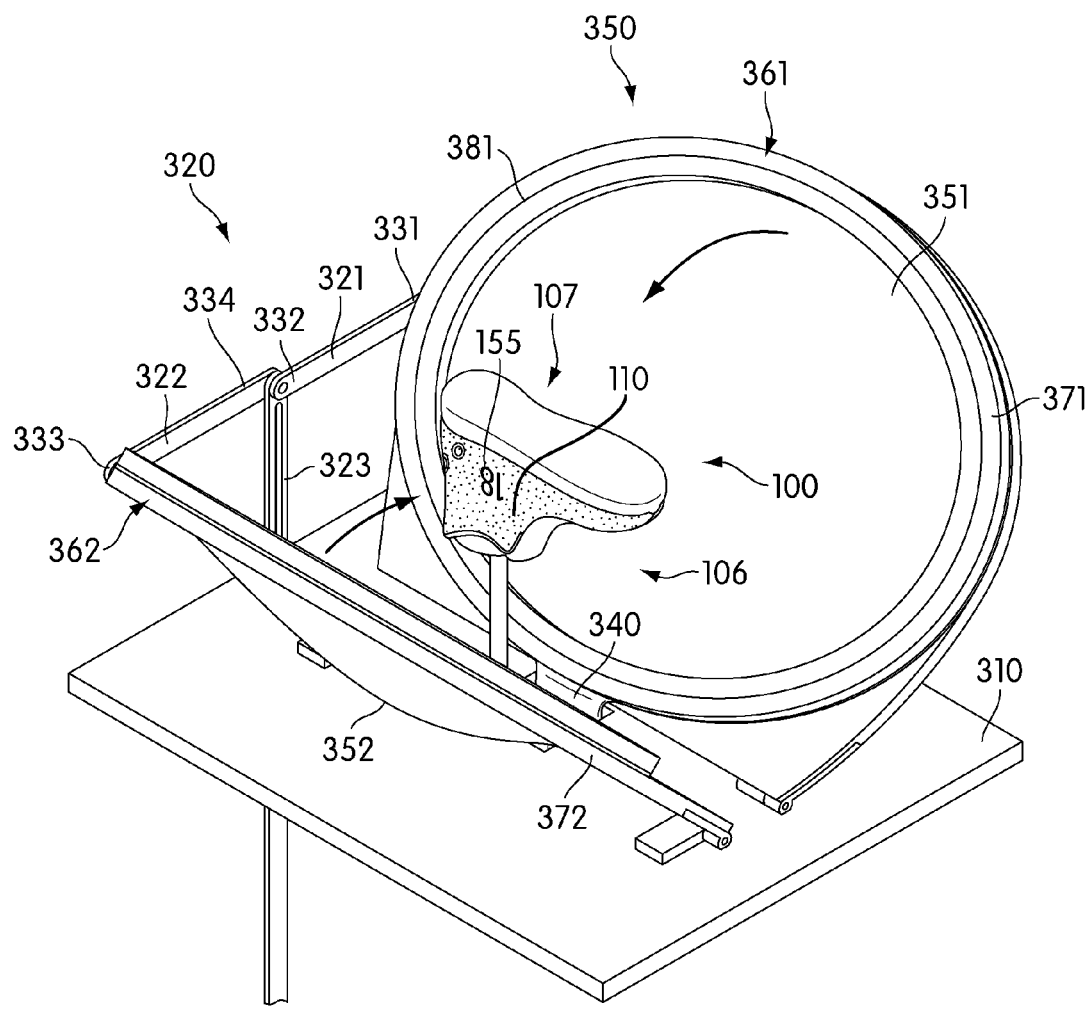
FIG. 7 is a schematic view of an embodiment of an article disposed on a graphic transfer assembly with deformable membranes configured to press against portions of the article.

In some cases, first deformable membrane 351 may be associated with medial portion 107 of article 100, as illustrated in FIG. 7. Similarly, second deformable membrane 352 may be associated with lateral portion 106 of article 100. In other cases, first deformable membrane 351 and second deformable membrane 352 may be associated with other portions of article 100. For example, first deformable membrane 351 may be associated with a toe portion of article 100. Likewise, second deformable membrane 352 may be associated with a heel portion of article 100.

In some embodiments, a graphic transfer assembly may include provisions to press a deformable membrane against a portion of an article. In some cases, a graphic transfer assembly may move an article against a deformable membrane. In other words, a deformable membrane may be fixed in a stationary position while an article is pressed into the deformable membrane. In other cases, a graphic transfer assembly may move a deformable membrane against an article. In other words, an article may be fixed in a stationary position while a deformable membrane is pressed against the article. In an exemplary embodiment, a graphic transfer assembly may include moveable portions to move deformable membranes against portions of an article.

Referring to FIG. 7, graphic transfer assembly 350 includes first moveable portion 361 and second moveable portion 362. First moveable portion 361 may be associated with first deformable membrane 351. Likewise, second moveable portion 362 may be associated with second deformable membrane 352.

Generally, first moveable portion 361 and second moveable portion 362 may be configured with any shape and size, including, but not limited to: square shapes, rectangular shapes, elliptical shapes, triangular shapes, regular shapes, irregular shapes as well as other types of shapes. In one embodiment, first moveable portion 361 and second moveable portion 362 may be configured with an oval shape.

In one embodiment, first moveable portion 361 may comprise first outer frame 371, as illustrated in FIG. 7. In some cases, first outer frame 371 of first moveable portion 361 may be disposed around a periphery of first deformable membrane 351. In particular, first deformable membrane 351 may be attached to first moveable portion 361 at first outer frame 371.

In a similar manner, second moveable portion 362 may include second outer frame 372. Second outer frame 372 may be disposed around a periphery of second deformable membrane 352. In particular, second deformable membrane 352 may be attached to second moveable portion 362 at second outer frame 372.

First moveable portion 361 and second moveable portion 362 may also be attached to other portions of graphic transfer assembly 350. In one embodiment, first outer frame 371 of first moveable portion 361 and second outer frame 372 of second moveable portion 362 may be attached to base portion 310 of graphic transfer assembly 350. With this arrangement, base portion 310 may provide support for first moveable portion 361 and second moveable portion 362.

In some embodiments, first outer frame 371 and second outer frame 372 may include provisions for joining first moveable portion 361 and second moveable portion 362 together. In some cases, first outer frame 371 and second outer frame 372 may include seals to join first moveable portion 361 and second moveable portion 362. Referring to FIG. 6, first outer frame 371 includes seal 381. For example, in one embodiment, seal 381 may be a gasket seal. In some cases, second outer frame 372 may include a corresponding seal. In other cases, only seal 381 may be used. With this arrangement, first moveable portion 361 may be joined with second moveable portion 362 in a substantially air tight manner.

In some embodiments, graphic transfer assembly 350 may be associated with an actuator that is configured to control first moveable portion 361 and second moveable portion 362. In one embodiment, graphic transfer assembly 350 includes actuator 320. Generally, actuator 320 may be configured in various manners known in the art to control first moveable portion 361 and second moveable portion 362. In an exemplary embodiment, actuator 320 may be configured with first lateral portion 321 to control first moveable portion 361. Also, actuator 320 may include second lateral portion 322 to control second moveable portion 362.

In some cases, first lateral portion 321 may be attached to first outer frame 371 of first moveable portion 361. In particular, first end portion 331 of first lateral portion 321 may be attached to first outer frame 371. Likewise, second end portion 332 of first lateral portion 321 may be attached to central portion 323 of actuator 320. In a similar manner, second lateral portion 322 may be attached to second outer frame 372 of second moveable portion 362. In particular, first end portion 333 of second lateral portion 322 may be attached to second outer frame 372. In addition, second end portion 334 of second lateral portion 322 may be attached to central portion 323 of actuator 320.

Figure 8:
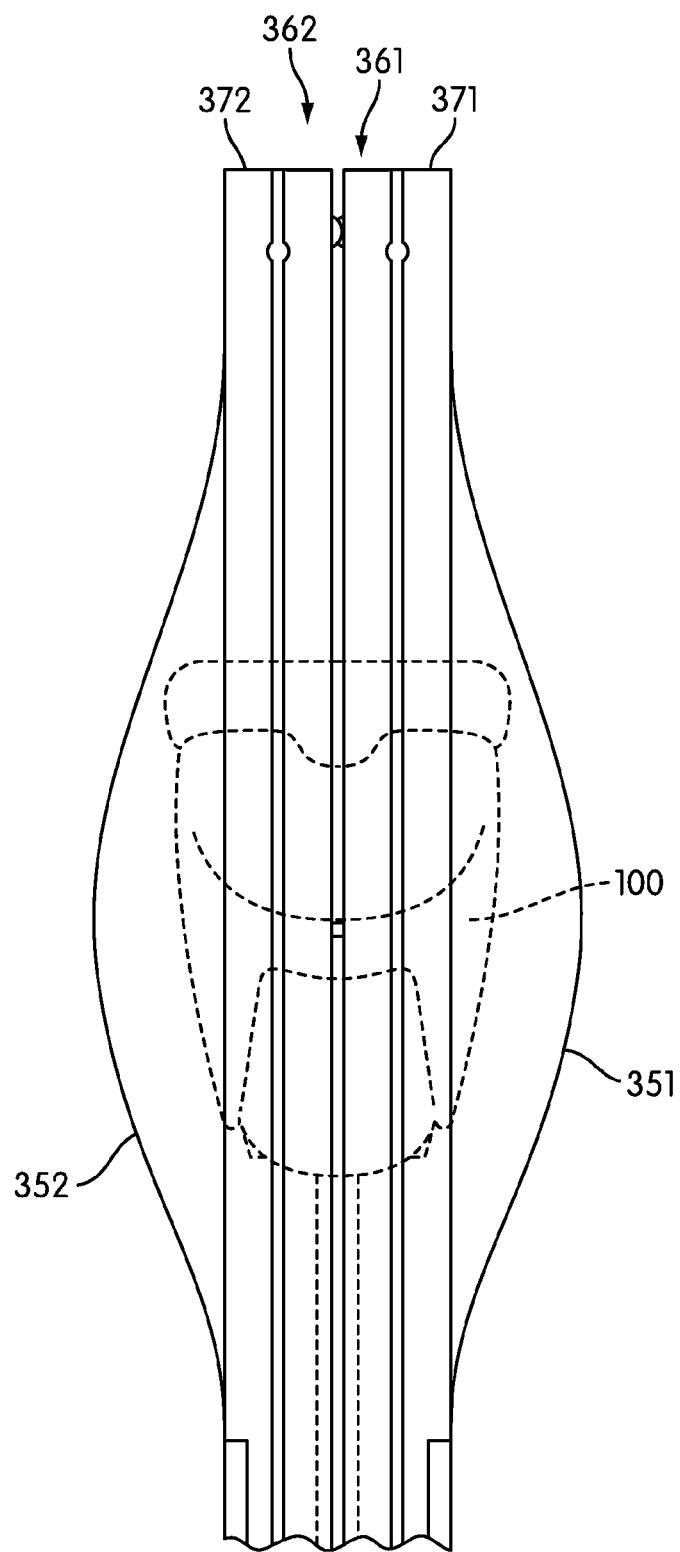
FIG. 8 is a schematic view of an embodiment of an article disposed on a graphic transfer assembly with deformable membranes enclosing curved portions of the article.
Figure 9:
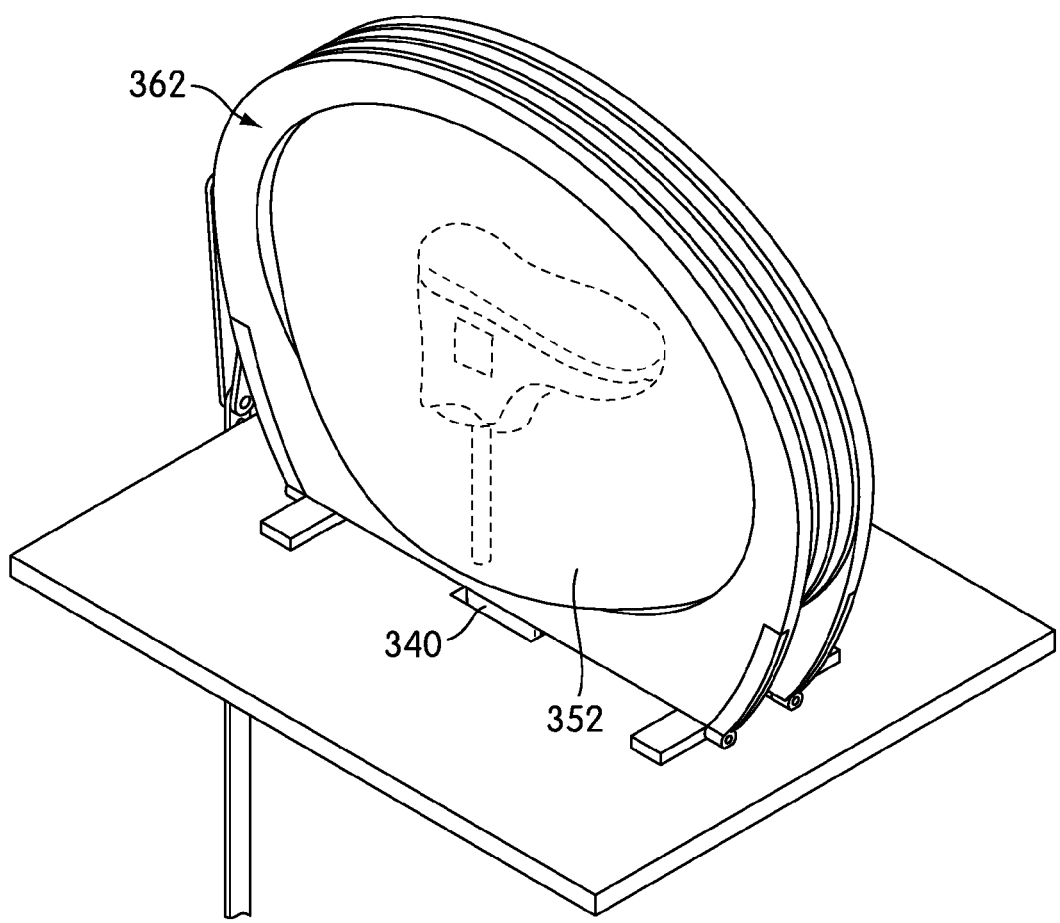
FIG. 9 is a side view of an embodiment of an article disposed between deformable membranes enclosing curved portions of the article.

With first outer frame 371 and second outer frame 372 attached to first lateral portion 321 and second lateral portion 322, respectively, as well as to base portion 310, actuator 320 may be configured to move first moveable portion 361 and second moveable portion 362 in a manner substantially similar to a clam shell closing. In one embodiment, actuator 320 may depress central portion 323 to pull second end portion of 332 of first lateral portion 321 and second end portion 334 of second lateral portion 322 in a downward direction. As second end portion 332 and second end portion 334 are pulled downward, first end portion 331 and first end portion 333 may be pulled upward and inward. This arrangement pulls first moveable portion 361 and second moveable portion 362 inward. With this arrangement, first moveable portion 361 and second moveable portion 362 may be pressed against each other at first outer frame 371 and second outer frame 372, as illustrated in FIGS. 8 and 9. In some cases, first seal 381 and second seal 382 may join as first outer frame 371 and second outer frame 372 are pressed against each other together.

As first moveable portion 361 and second moveable portion 362 are pressed against each other, first deformable membrane 351 and second deformable membrane 352 may be pressed against article 100. In some embodiments, first deformable membrane 351 and second deformable membrane 352 may press against portions of article 100 that do not comprise a substantial entirety of article 100. In other embodiments, first deformable membrane 351 and second deformable membrane 352 may press against portions of article 100 that comprise a substantial entirety of article 100.

In some embodiments, a deformable membrane may press against a portion of an article in a relatively loose manner. In other words, the deformable membrane may not conform to a curved portion of an article when the deformable membrane presses against the article. In an exemplary embodiment, first deformable membrane 351 and second deformable membrane 352 are pressed against portions of article 100 in a relatively loose manner, as illustrated in FIGS. 8 and 9.

A graphic transfer assembly may include provisions to assist a deformable membrane in conforming to a curved portion of an article. In some embodiments, a deformable membrane may be tightened against a portion of an article to conform to a curved portion of the article. In some cases, air between deformable membranes may be evacuated so that the deformable membranes conform to curved portions of an article.

In one embodiment, graphic transfer assembly 350 may include air valve 340. Generally, air valve 340 may be associated with graphic transfer assembly 350 in a manner known in the art that allows air valve 340 to evacuate air from between first deformable membrane 351 and second deformable membrane 352. In one embodiment, air valve 340 disposed between first moveable portion 361 and second moveable portion 362, as illustrated in FIGS. 7 and 9. Air valve 340 may also be attached to a vacuum tank, not shown in these Figures. With this arrangement, air valve 340 may evacuate air from a space between first deformable membrane 351 and second deformable membrane 352 when first seal 381 and second seal 382 are joined.

Figure 10:
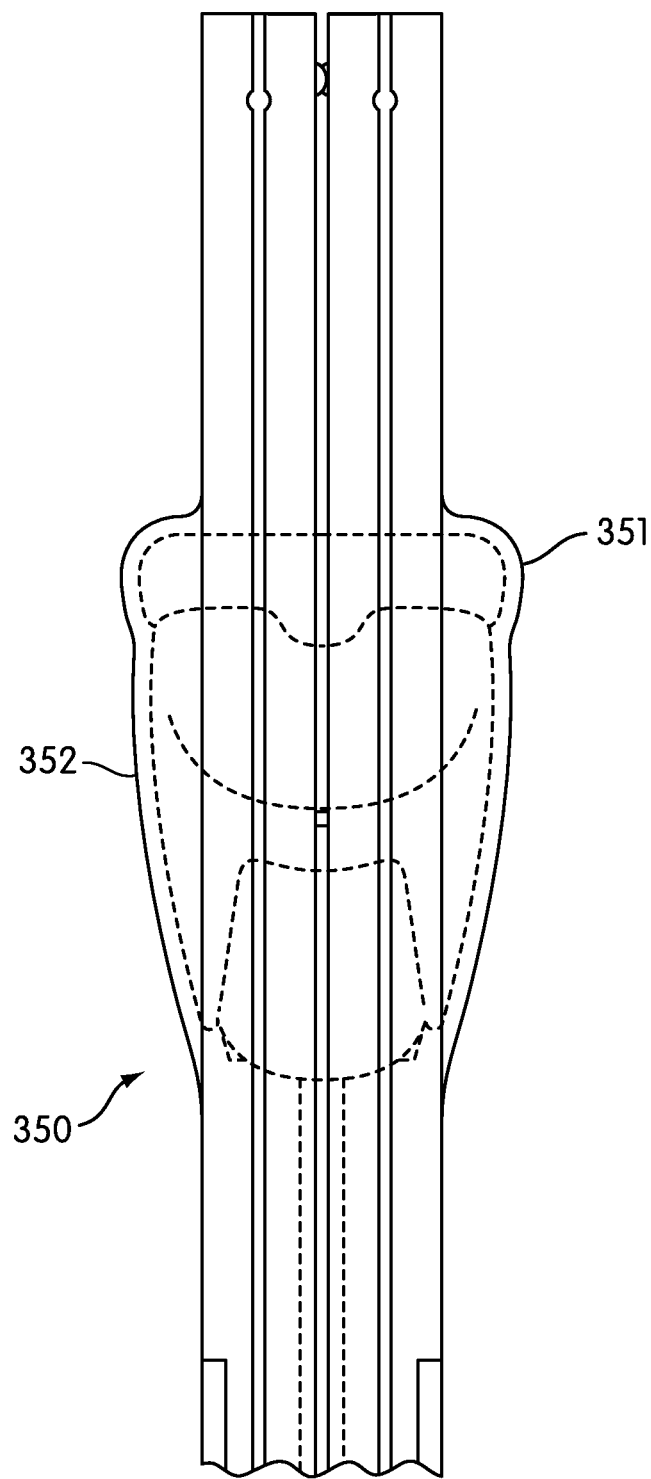
FIG. 10 is a schematic view of an embodiment of an article disposed on a graphic transfer assembly with deformable membranes conforming to curved portions of the article.
Figure 11:
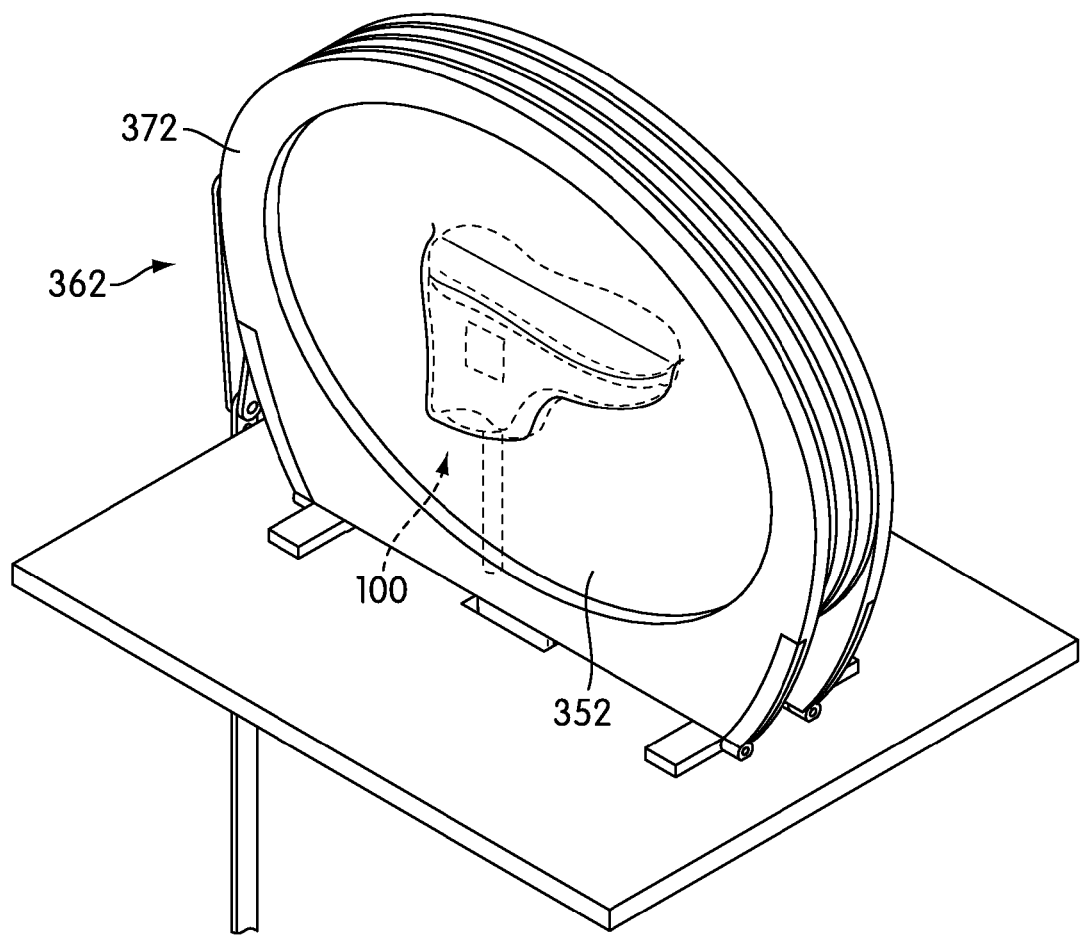
FIG. 11 is a side view of an embodiment of an article disposed between deformable membranes conforming to curved portions of the article.

Referring to FIGS. 10 and 11, air is evacuated from a space between first deformable membrane 351 and second deformable membrane 352. This allows first deformable membrane 351 and second deformable membrane 352 to conform to curved portions of article 100. In particular, first deformable membrane 351 conforms to curved portions of medial portion 107 of article 100. In a similar manner, second deformable membrane 352 conforms to curved portions of lateral portion 106 of article 100.

In order to apply a graphic to an article, heat may be used to attach the graphic to the article. In some embodiments, heat may be applied by heating elements disposed adjacent to a deformable membrane. In other embodiments, heat may be applied by heat radiated from a deformable membrane. In some cases, heating wires may be embedded in a deformable membrane. In other cases, a deformable membrane may comprise a heat conducting material to transfer heat to an article.

With first deformable membrane 351 and second deformable membrane 352 conforming to curved portions of article 100, heat may be transferred through first deformable membrane 351 and second deformable membrane 352 to apply graphic 110 to article 100. In an exemplary embodiment, heating wires embedded in first deformable membrane 351 and second deformable membrane 352 may be heated to apply graphic 110 to article 100.

Figure 12:
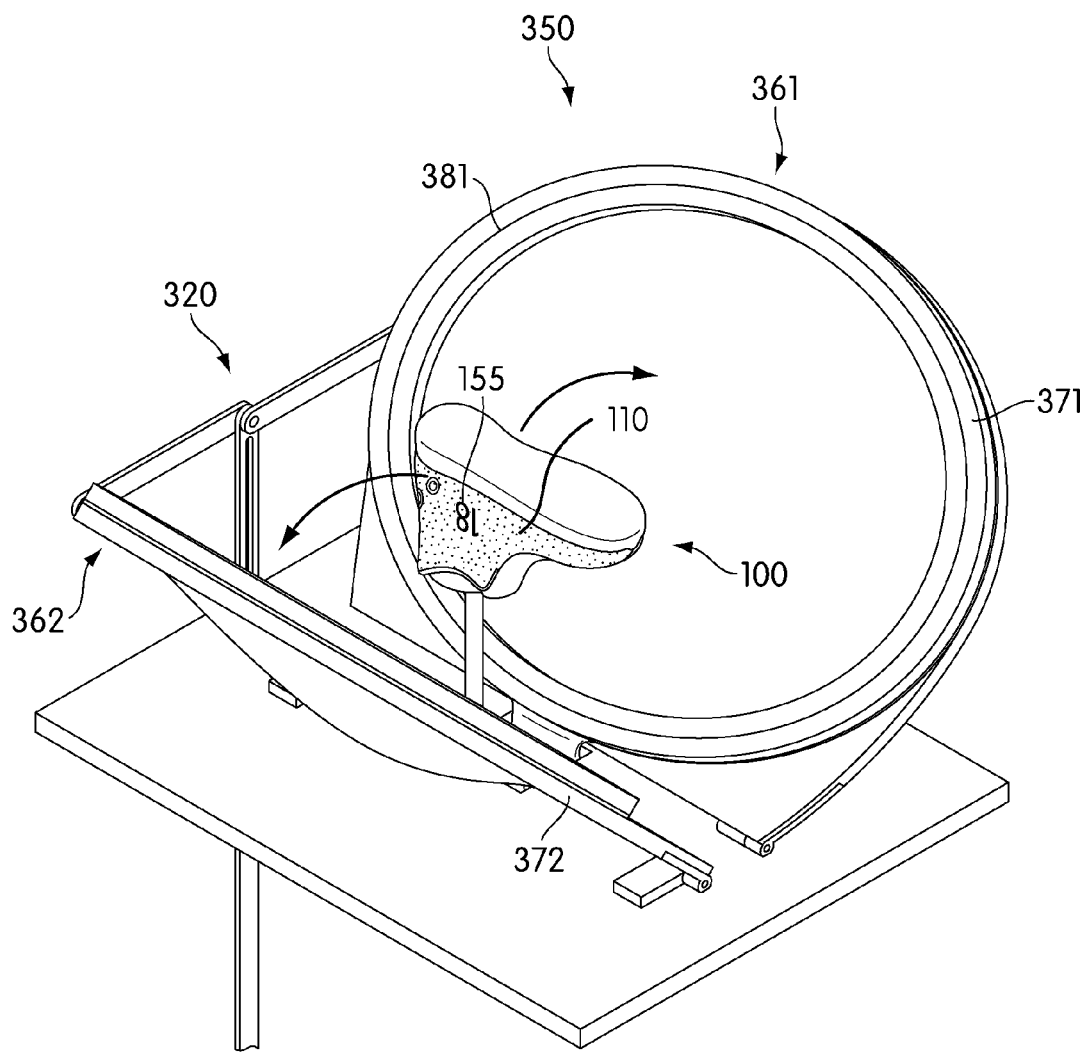
FIG. 12 is a schematic view of an embodiment of deformable membranes of a graphic transfer assembly moving away from an article.

Following heat transfer of graphic 110 to article 100, graphic 110 may be applied to article 100. With graphic 110 applied to article 100, actuator 320 may be configured to open first moveable portion 361 and second moveable portion 362, as illustrated in FIG. 12. With first moveable portion 361 and second moveable portion 362 no longer pressing against article 100, article 100 may be removed from last 301, as seen in FIG. 6, and graphic transfer assembly 350.

Figure 13:
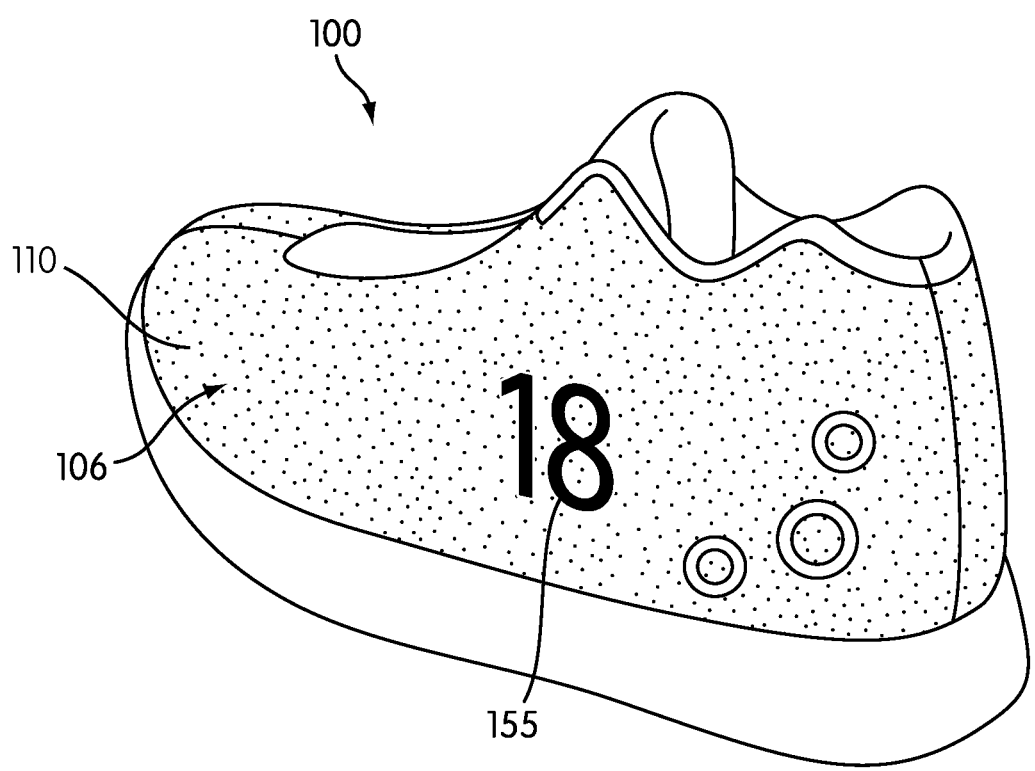
FIG. 13 is a schematic view of an embodiment of an article with a graphic applied to a curved portion of the article.

Referring to FIG. 13, graphic 110 is applied to lateral portion 106 of article 100. Although only one graphic is applied to article 100 in this exemplary embodiment, it should be understood that additional graphics may be applied to article 100 at a substantially same time as graphic 110 is applied to lateral portion 106. For example, a graphic associated with medial portion 107 of article 100 may be applied at substantially the same time as graphic 110. In other words, this method may be used to apply multiple graphics to portions of article 100 at a substantially same time.

Graphic transfer assembly 350 may be used to apply graphics to various types of articles. In particular, first deformable membrane 351 and second deformable membrane 352 may be configured to conform to a variety of curved portions associated with various types of articles. For example, FIGS. 11-13 illustrate an embodiment of a method of applying a graphic to an article with a low top upper.

Figure 14:
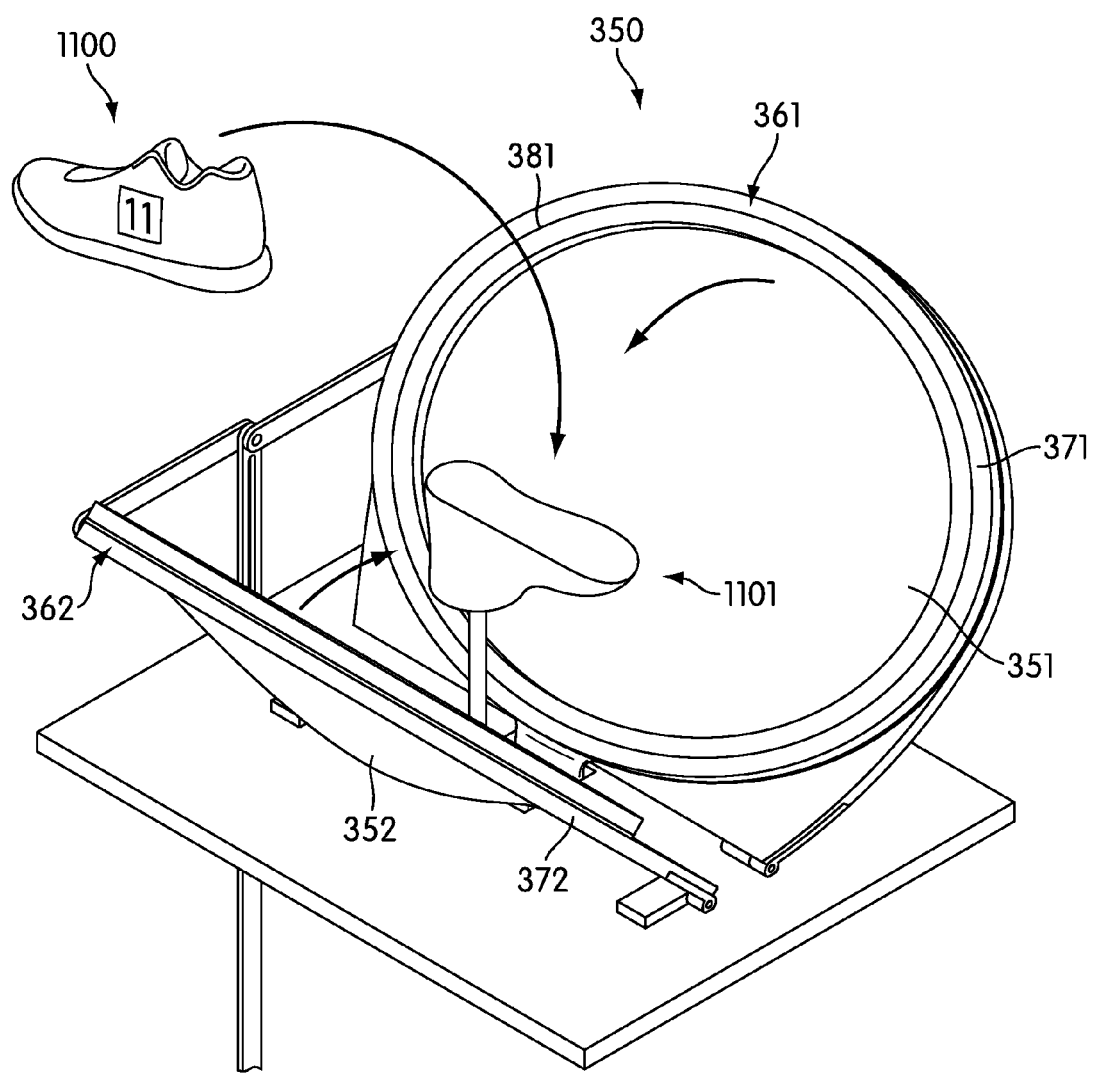
FIG. 14 is a schematic view of an embodiment of an article associated with a last and disposed on a graphic transfer assembly.

Referring to FIG. 14, a graphic associated with article 1100 may be applied to article 1100 by graphic transfer assembly 350. In one embodiment, article 1100 may be a low top running shoe. In order to apply a graphic to article 1100, article 1100 may be associated with last 1101. Last 1101 may be attached to graphic transfer assembly 350. With article 1100 disposed on graphic transfer assembly 350, first moveable portion 361 and second moveable portion 362 may be moved to press first deformable membrane 351 and second deformable membrane 352 against article 100 in a substantially similar manner as the previous embodiment.

Figure 15:
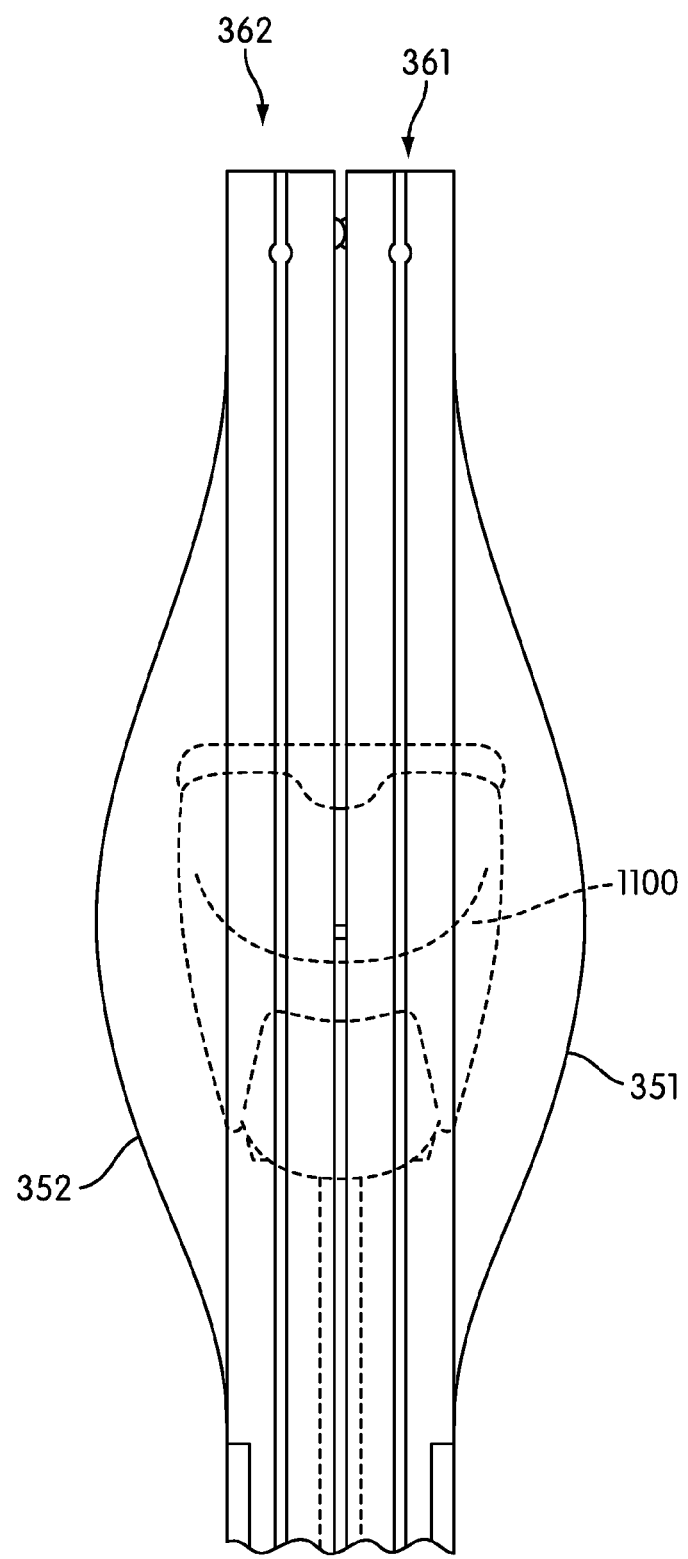
FIG. 15 is a schematic view of an embodiment of deformable membranes of a graphic transfer assembly enclosing an article.
Figure 16:
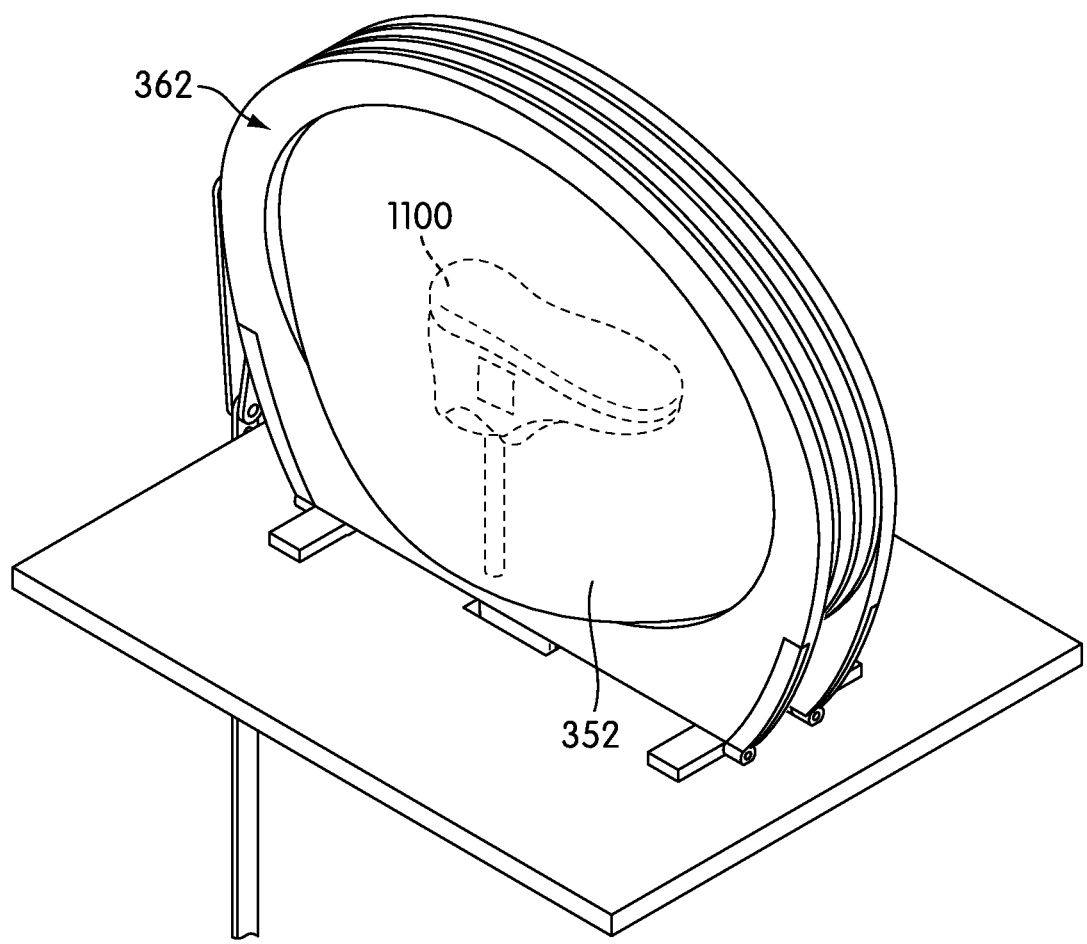
FIG. 16 is a side view of an embodiment of deformable membranes of a graphic transfer assembly conforming to curved portions of an article.

After first moveable portion 361 and second moveable portion 362 are joined, air may be evacuated from a space between first deformable membrane 351 and second deformable membrane 352. This allows first deformable membrane 351 and second deformable membrane 352 to conform to curved portions of article 1100, as illustrated in FIGS. 15 and 16. With this arrangement, heat may be transferred by first deformable membrane 351 and second deformable membrane 352 to apply a graphic to article 1100.

A graphic transfer assembly can include provisions for automatically opening and closing. For example, in some embodiments, a graphic transfer assembly can include automatically controlled actuators for opening and closing one or more moveable portions of the graphic transfer assembly.

Figure 17:
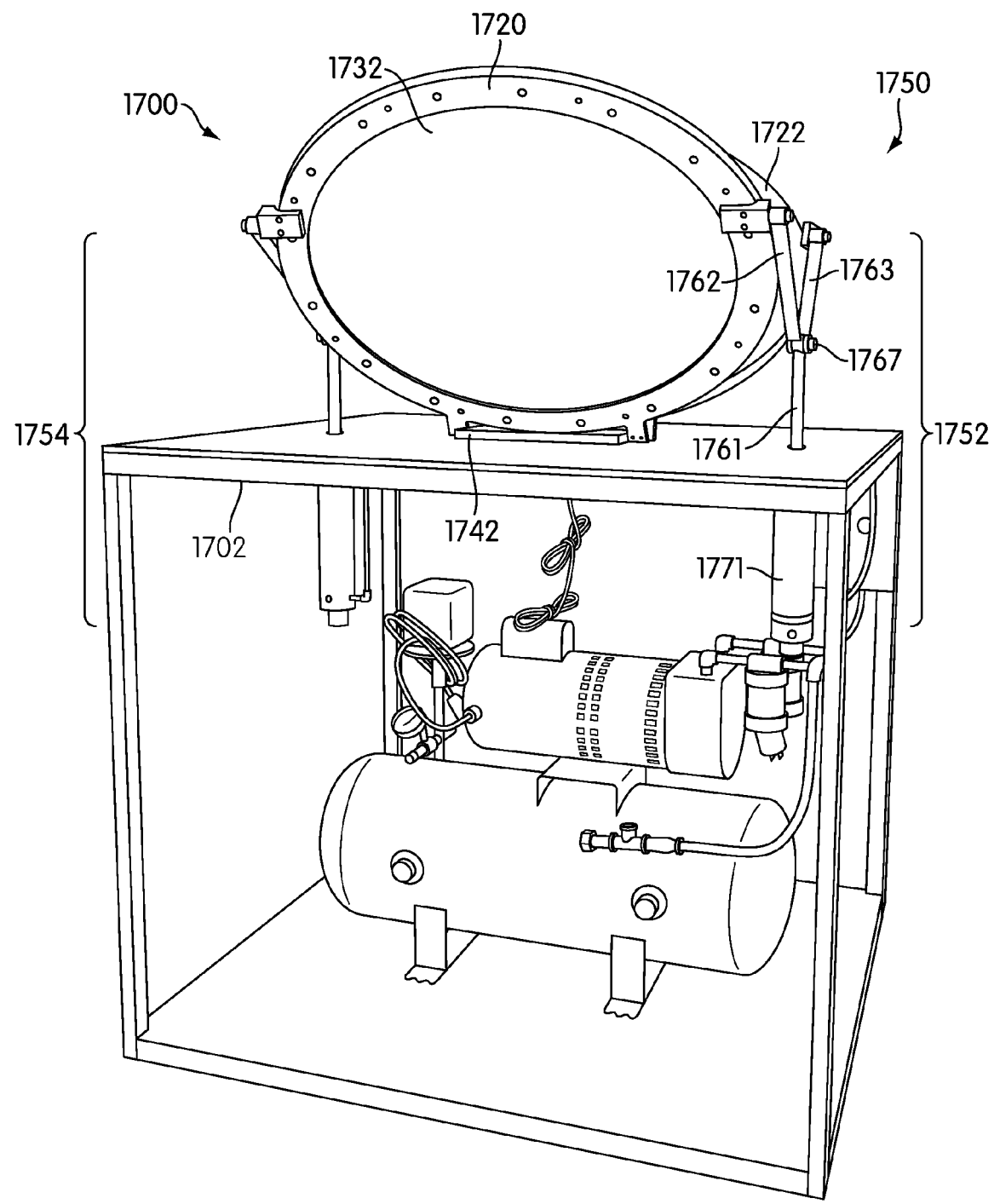
FIG. 17 is an isometric view of an exemplary embodiment of a graphic transfer assembly.
Figure 18:
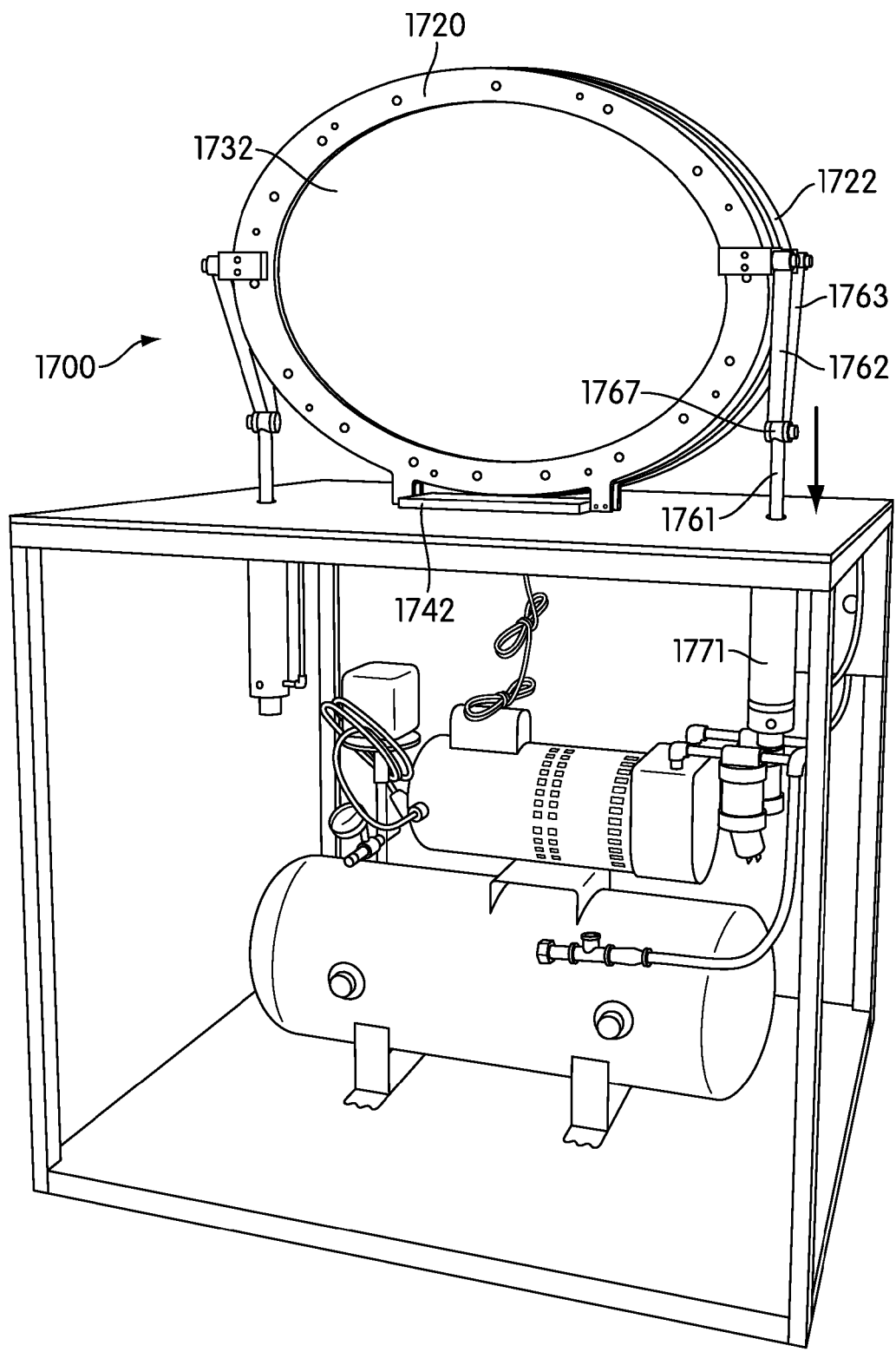
FIG. 18 is an isometric view of an exemplary embodiment of a graphic transfer assembly.

FIGS. 17 and 18 illustrate another embodiment of a graphic transfer assembly. Referring to FIGS. 17 and 18, graphic transfer assembly 1700 includes base portion 1702. In some cases, graphic transfer assembly 1700 can further include first moveable portion 1720 and second moveable portion 1722. Also, first moveable portion 1720 and second moveable portion 1722 may be further associated with first deformable membrane 1732 and a second deformable membrane, which is not visible.

In some embodiments, first moveable portion 1720 may be attached to base portion 1702 at first pivot attachment 1742. Likewise, second moveable portion 1722 may be attached to base portion 1702 at a similar pivot attachment that is disposed adjacent to first pivot attachment 1742. With this arrangement, first moveable portion 1720 and second moveable portion 1722 can be drawn apart to insert a last and/or an article and can also be drawn together to apply a graphic to an article in the manner previously discussed.

In this embodiment, graphic transfer assembly 1700 further includes actuation system 1750. In particular, actuation system 1750 comprises first actuator assembly 1752 and second actuator assembly 1754. In some cases, first actuator assembly 1752 includes first portion 1761, second portion 1762 and third portion 1763. First portion 1761 may be connected to first actuating device 1771. Additionally, second portion 1762 may extend from first portion 1761 to first moveable portion 1720. Likewise, third portion 1763 may extend from second portion 1762 to second moveable portion 1722. In some cases, second portion 1762 and third portion 1763 may also pivot with respect to first portion 1761 at pivot joint 1767. With this arrangement, as first portion 1761 is moved in a vertical direction, second portion 1762 and third portion 1763 apply forces to first moveable portion 1720 and second moveable portion 1722. In particular, as first portion 1761 is moved in an upwards direction, second portion 1762 and third portion 1763 rotate away from one another and push first moveable portion 1720 and second moveable portion 1722 apart, as seen in FIG. 17. Likewise, as first portion 1761 is pulled in a downwards direction, second portion 1762 and third portion 1763 rotate towards each other and pull first moveable portion 1720 and second moveable portion 1722 together, as seen in FIG. 18.

In an exemplary embodiment, the movement of first portion 1761 is controlled by first actuating device 1771. In different embodiments, first actuating device 1771 can be any type of actuating device. In some cases, first actuating device 1771 can be a pneumatic actuator. Examples of pneumatic actuating devices include, but are not limited to, rotary actuators, tie rod actuators, grippers, rodless actuators with mechanical linkage, rodless actuators with magnetic linkage, as well as any other type of pneumatic actuator. In still other cases, first actuating device 1771 could be another type of actuating device, including but not limited to electric actuators, motors, hydraulic cylinders, linear actuators or any other type of actuator.

In some embodiments, second actuator assembly 1754 may be configured to facilitate opening and closing of first moveable portion 1720 and second moveable portion 1722 in a similar manner to first actuator assembly 1752. Using two actuator assemblies on opposing ends of graphic transfer assembly 1700 can facilitate the opening and closing of first moveable portion 1722 and second moveable portion 1724.

It should be further understood that although the current embodiment employs an actuation system for opening and closing a graphic transfer assembly, in other embodiments different types of systems could be used. For example, in one embodiment, a first moveable portion and a second moveable portion of a graphic transfer assembly could be manually opened and closed by lifting and lowering the moveable portions between an open and closed position. In another example, a motor could be attached to one or more pivot portions of the moveable portions to control the motion of the moveable portions.

Figure 19:
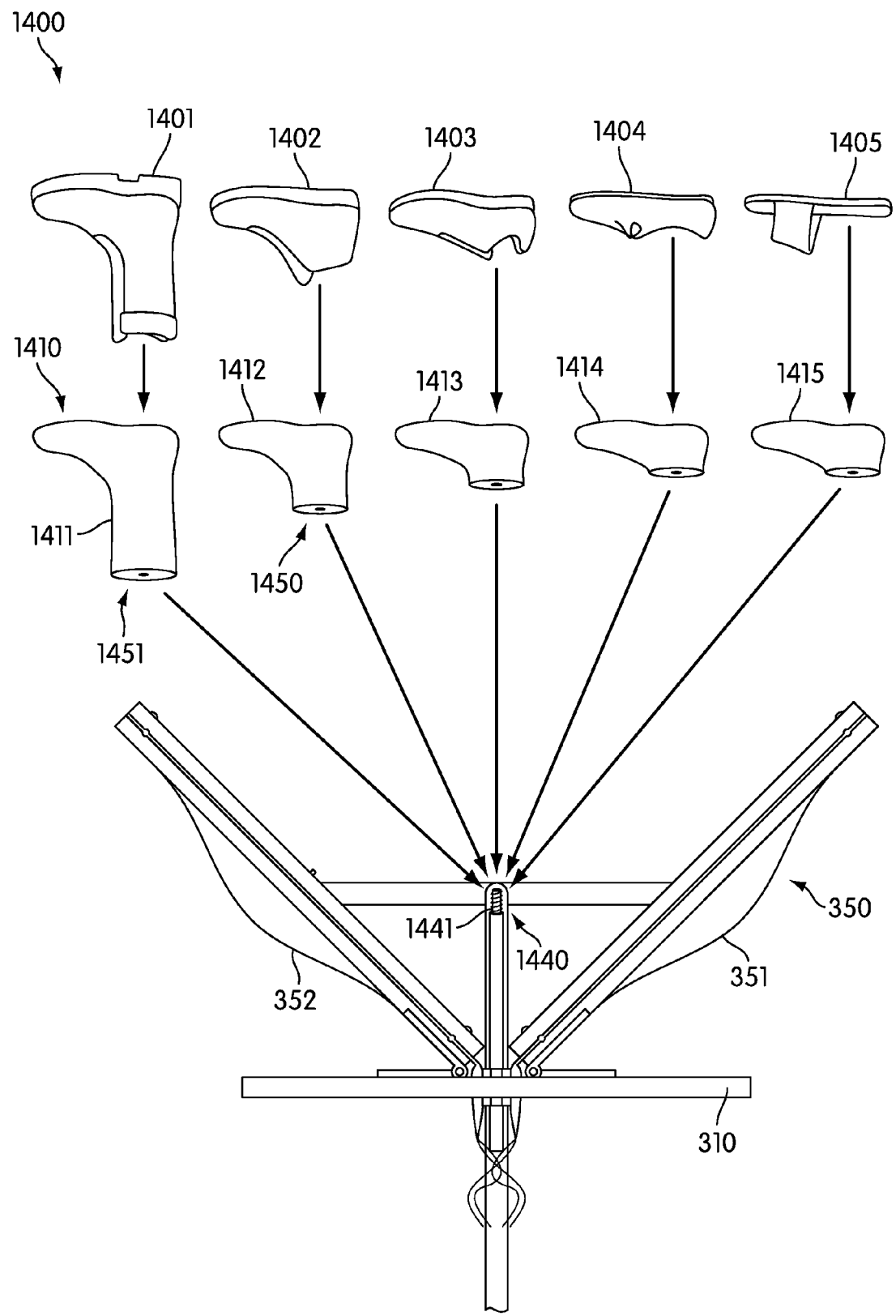
FIG. 19 is a schematic view of an embodiment of a set of articles that may be associated with a set of lasts and attached to a last assembly of a graphic transfer assembly.

In other embodiments, graphics may be applied to a set of different types of articles by graphic transfer assembly 350. FIG. 19 illustrates an exemplary embodiment of set of articles 1400 that may be associated with graphics that may be applied by graphic transfer assembly 350. In one embodiment, set of articles 1400 includes first article 1401, second article 1402, third article 1403, fourth article 1404 and fifth article 1405. Set of articles 1400 may include at least two different types of articles. For example, first article 1401 is a boot. Second article 1402 is a basketball shoe. Likewise, third article 1403 is a running shoe. In addition, fourth article 1404 is a ballet slipper. Finally, fifth article 1405 is a sandal. With this configuration, set of articles 1400 includes at least two different types of articles.

In some embodiments, articles of set of articles 1400 may comprise different materials. Examples of different materials include, but are not limited to: fabric, plastic, leather as well as other types of materials suitable for articles. Graphic transfer assembly 350 may be configured to apply graphics to articles comprising different types of materials. In particular, first deformable membrane 351 and second deformable membrane 352 may be configured to apply graphics to different types of materials comprising articles.

In some embodiments, set of articles 1400 may be associated with a set of lasts. In one embodiment, set of lasts 1410 includes first last 1411, second last 1412, third last 1413, fourth last 1414 and fifth last 1415. Set of lasts 1410 may be associated with set of articles 1400 according to the size and shape of articles of set of articles 1400. For example, first last 1411 may be associated with first article 1401. Also, second last 1412 may be associated with second article 1402. Similarly, third last 1413 may be associated with third article 1403. Likewise, fourth last 1414 may be associated with fourth article 1404. Finally, fifth last 1415 may be associated with fifth article 1405.

A graphic transfer assembly may include provisions to facilitate the application of graphics to different types of articles. In some embodiments, a graphic transfer assembly may include a last assembly to facilitate the application of graphics to different types of articles. In some cases, the last assembly may include a fastener configured to attach a set of lasts to a graphic transfer assembly. Examples of fasteners that may comprise a last assembly include, but are not limited to: a bolt, screw or other type of fastener known in the art. With this arrangement, a last assembly may provide interchangeability for a graphic transfer assembly by allowing different lasts associated with different articles to be attached to the graphic transfer assembly.

In an exemplary embodiment, graphic transfer assembly 350 includes last assembly 1440. Last assembly 1440 is configured to attach a last to base portion 310 of graphic transfer assembly 350. In particular, last assembly 1440 includes fastener 1441. In some cases, fastener 1441 may be inserted within a portion of a last in order to attach the last to last assembly 1440. With this arrangement, last assembly 1440 provides interchangeability for graphic transfer assembly 350 by allowing different lasts associated with different articles to be attached to graphic transfer assembly 350.

In one embodiment, lasts of set of lasts 1410 are configured with fastener receiver holes 1450. Fastener receiver holes 1450 are configured to receive fastener 1441 of last assembly 1440. For example, first last 1411 includes first fastener receiver hole 1451. By inserting fastener 1441 into first fastener receiver hole 1451, first last 1411 and associated first article 1401 may be associated with last assembly 1440. After first article 1401 is associated with last assembly 1440, a graphic may be applied to first article 1401 in a substantially similar manner as discussed with respect to FIGS. 4-9. In addition, it should be understood that the remaining articles of set of articles 1400 may be associated with lasts of set of lasts 1410 and attached to last assembly 1440 in a similar manner. With this configuration, graphic transfer assembly 350 may transfer graphics to curved portions of articles of set of articles 1400.

Figure 20:
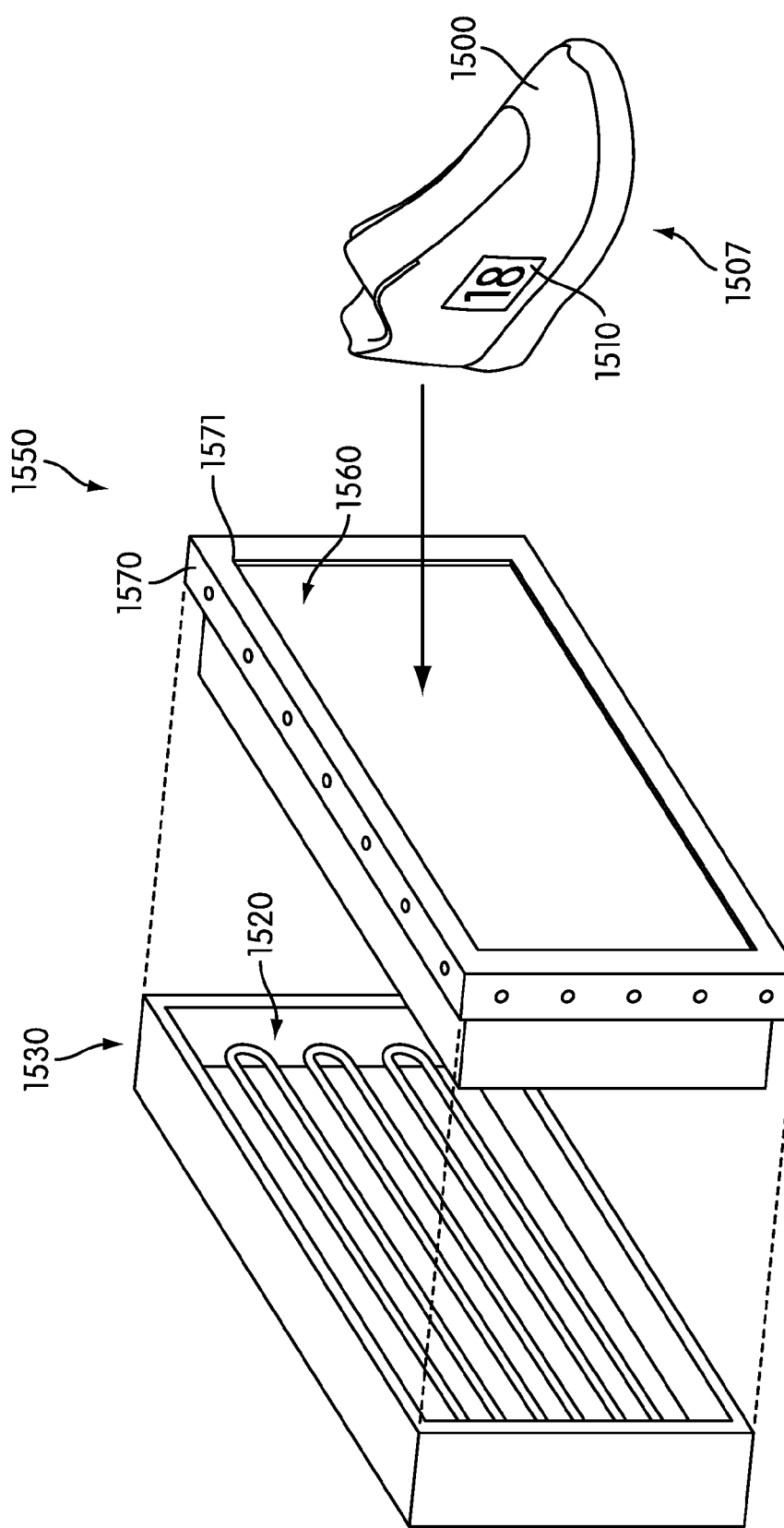
FIG. 20 is an exploded view of an exemplary embodiment of a graphic transfer assembly that may apply a graphic to a curved portion of an article.

FIG. 20 illustrates an exploded view of an exemplary embodiment of graphic transfer assembly 1550. Graphic transfer assembly 1550 includes deformable membrane 1560. In one embodiment, deformable membrane 1560 comprises a high temperature rubber. This configuration allows deformable membrane 1560 to conform to a portion of an article pressed against deformable membrane 1560.

A graphic transfer assembly may include provisions for using heating elements to transfer a graphic to a curved portion of an article. In some embodiments, heating elements may transfer heat to a deformable membrane in order to apply a graphic to a curved portion of an article. In some cases, heating elements may be filled with oil, water or other substances to transfer heat to a deformable membrane. In one embodiment, oil heating elements may be used to apply heat to a deformable membrane and transfer a graphic to a curved portion of an article.

In an exemplary embodiment, graphic transfer assembly 1550 includes heating elements 1520. Heating elements 1520 are oil heating elements. In other embodiments, heating elements 1520 may be another type of heating elements. Heating elements 1520 are configured to generate heat that may be transferred to deformable membrane 1560. In some cases, a portion of heating elements 1520 may be covered by housing portion 1530 of graphic transfer assembly 1550. This arrangement may help conserve heat generated by heating elements 1520.

As previously discussed, a graphic transfer assembly may include provisions to assist a deformable membrane in conforming to a curved portion of an article. In an exemplary embodiment, graphic transfer assembly 1550 includes chamber 1570. In some cases, chamber 1570 may be a diathermic oil plenum. In particular, chamber 1570 may be filled with an oil that provides heat conduction between a deformable membrane and one or more heating elements. Chamber 1570 may be disposed adjacent to deformable membrane 1560. In some cases, chamber 1570 may include cut out portion 1571. An outer periphery of deformable membrane 1560 may be attached to cut out portion 1571. With this arrangement, chamber 1570 may provide pressure against deformable membrane 1560 to help deformable membrane 1560 conform to a portion of an article.

In some embodiments, a provision that assists a deformable membrane in conforming to a curved portion of an article may also assist in transferring heat to the deformable membrane. For example, chamber 1570 may facilitate efficient heat transfer from heating elements 1520 to deformable membrane 1560 to aid in the transferring of a graphic to an article. In one embodiment, this may be achieved by attaching chamber 1570 to housing portion 1530. With heating elements 1520 disposed adjacent to chamber 1570, chamber 1570 may transfer heat from heating elements 1520 to deformable membrane 1560. Using this configuration, graphic transfer assembly 1550 may transfer a graphic to a portion of an article.

Figure 21:
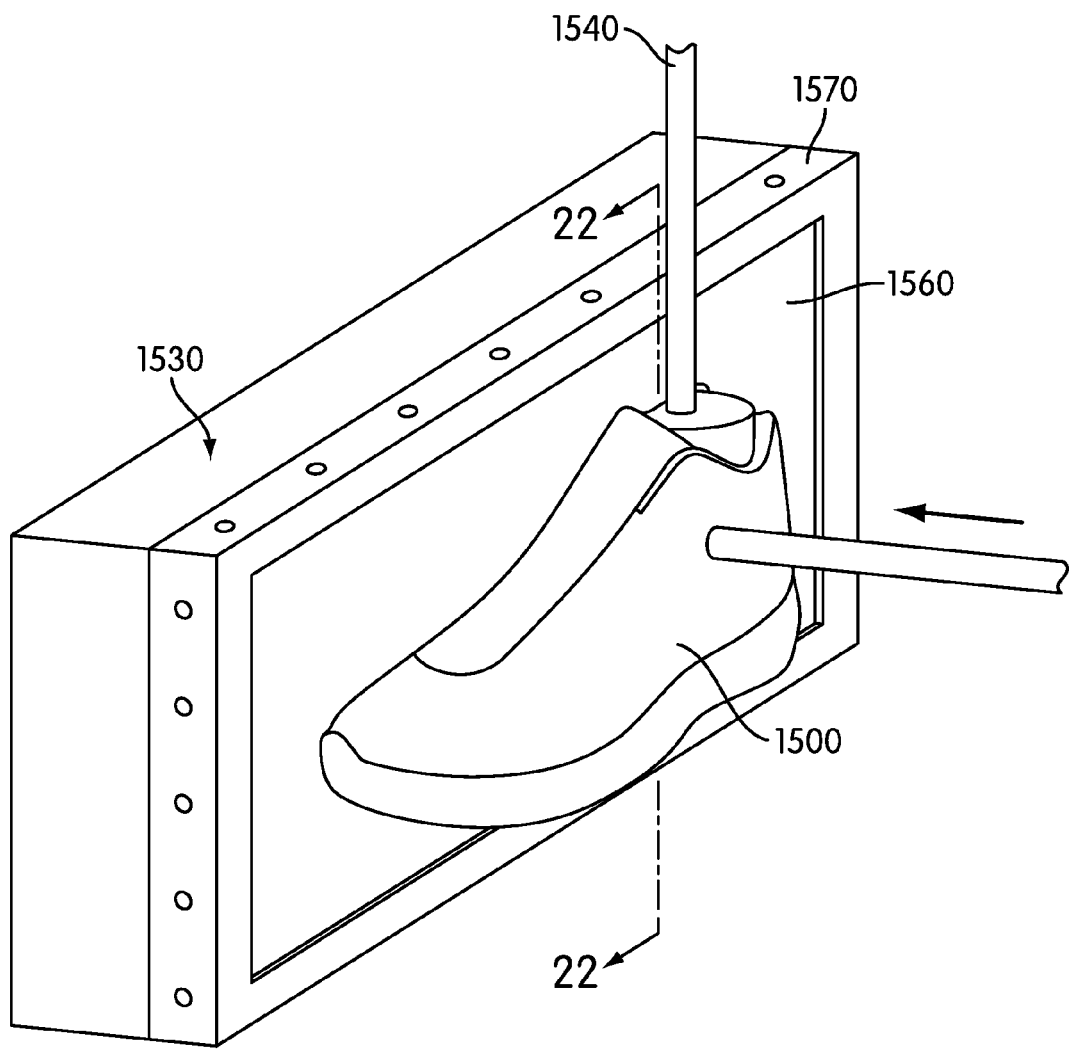
FIG. 21 is a schematic view of an embodiment of a graphic transfer assembly applying a graphic to an article.
Figure 22:
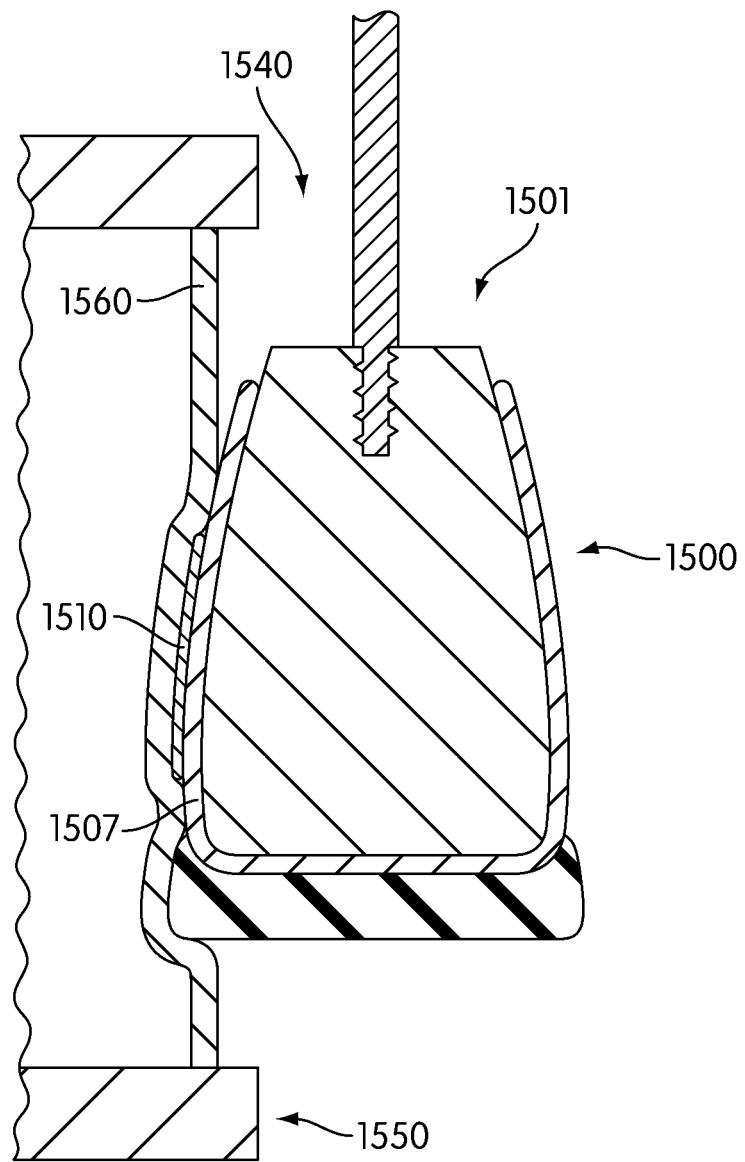
FIG. 22 is a cross sectional view of an embodiment of a graphic transfer assembly applying a graphic to a curved portion of an article.

In one embodiment, graphic transfer assembly 1550 may apply graphic 1510 to article 1500. Graphic 1510 may be associated with lateral portion 1507 of article 1500. Prior to application of graphic 1510 to lateral portion 1507, article 1500 may be associated with a last. Referring to FIGS. 21 and 22, article 1500 may be associated with last 1501. In addition, last 1501 may be attached to last assembly 1540. In particular, last 1501 may be attached to last assembly 1540 so that lateral portion 1507 is disposed adjacent to deformable membrane 1560.

Graphic transfer assembly 1550 may press article 1500 against deformable membrane 1560. As previously discussed, this may be achieved in various manners. In an exemplary embodiment, last assembly 1540 may move to push lateral portion 1507 of article 1500 against deformable membrane 1560. With lateral portion 1507 pressed against deformable membrane 1560, deformable membrane 1560 conforms to curved portions of lateral portion 1507, as illustrated in FIG. 22. Through the application of heat to graphic 1510 and lateral portion 1507, graphic transfer assembly 1550 may transfer graphic 1510 to lateral portion 1507 of article 1500.

In embodiments where multiple graphics may be applied to different portions of an article, a graphic transfer assembly may be configured to apply graphics to different portions of the article in a substantially simultaneous manner. In some embodiments, a graphic transfer assembly may be configured with one or more deformable membranes to apply graphics to different portions of an article. For example, in a previous embodiment, graphic transfer assembly 350 could apply graphics to different portions of an article. In other embodiments, a graphic transfer assembly may be configured with more than one graphic transfer assembly to apply graphics to different portions of an article.

Figure 23:
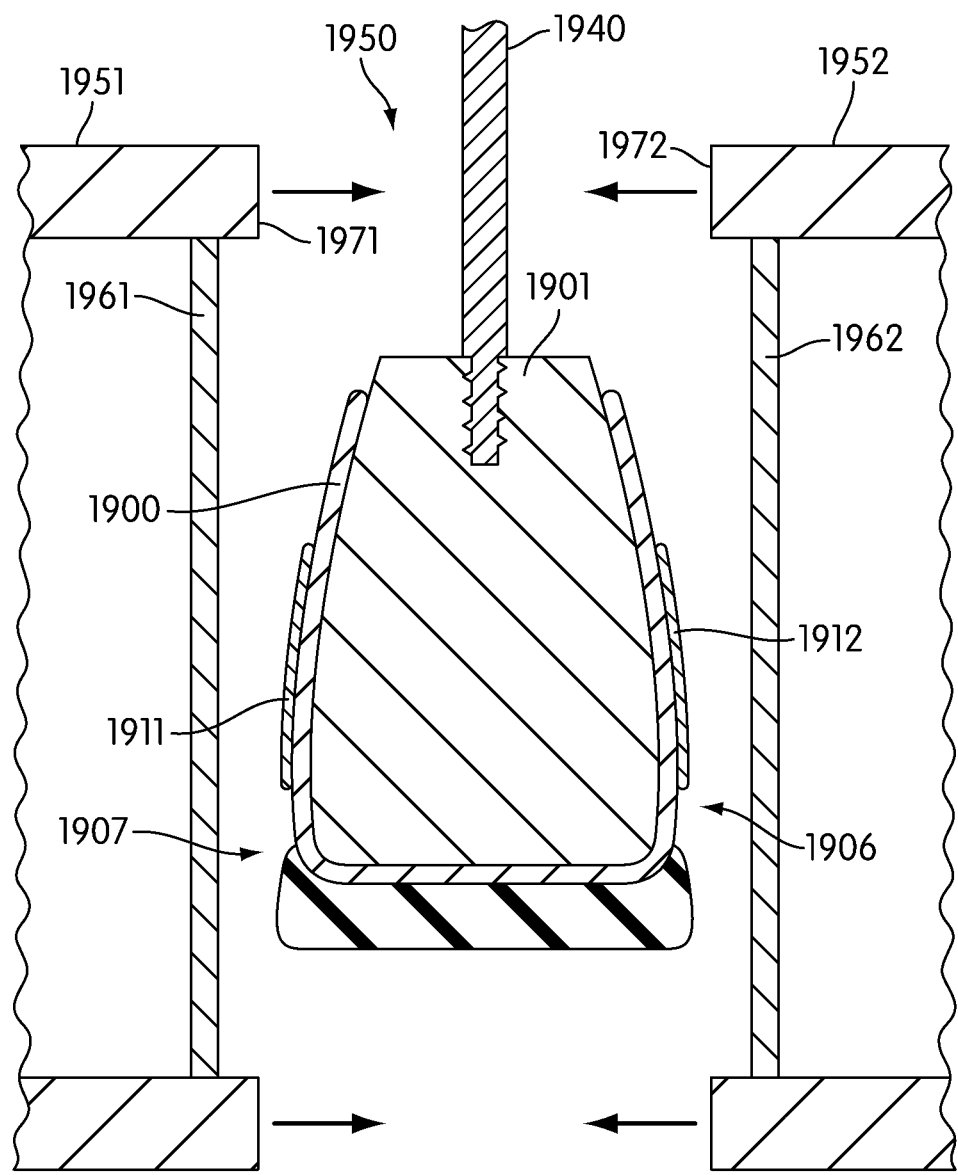
FIG. 23 is a cross sectional view of an exemplary embodiment of a graphic transfer assembly configured to apply two graphics to two curved portions of an article.
Figure 24:
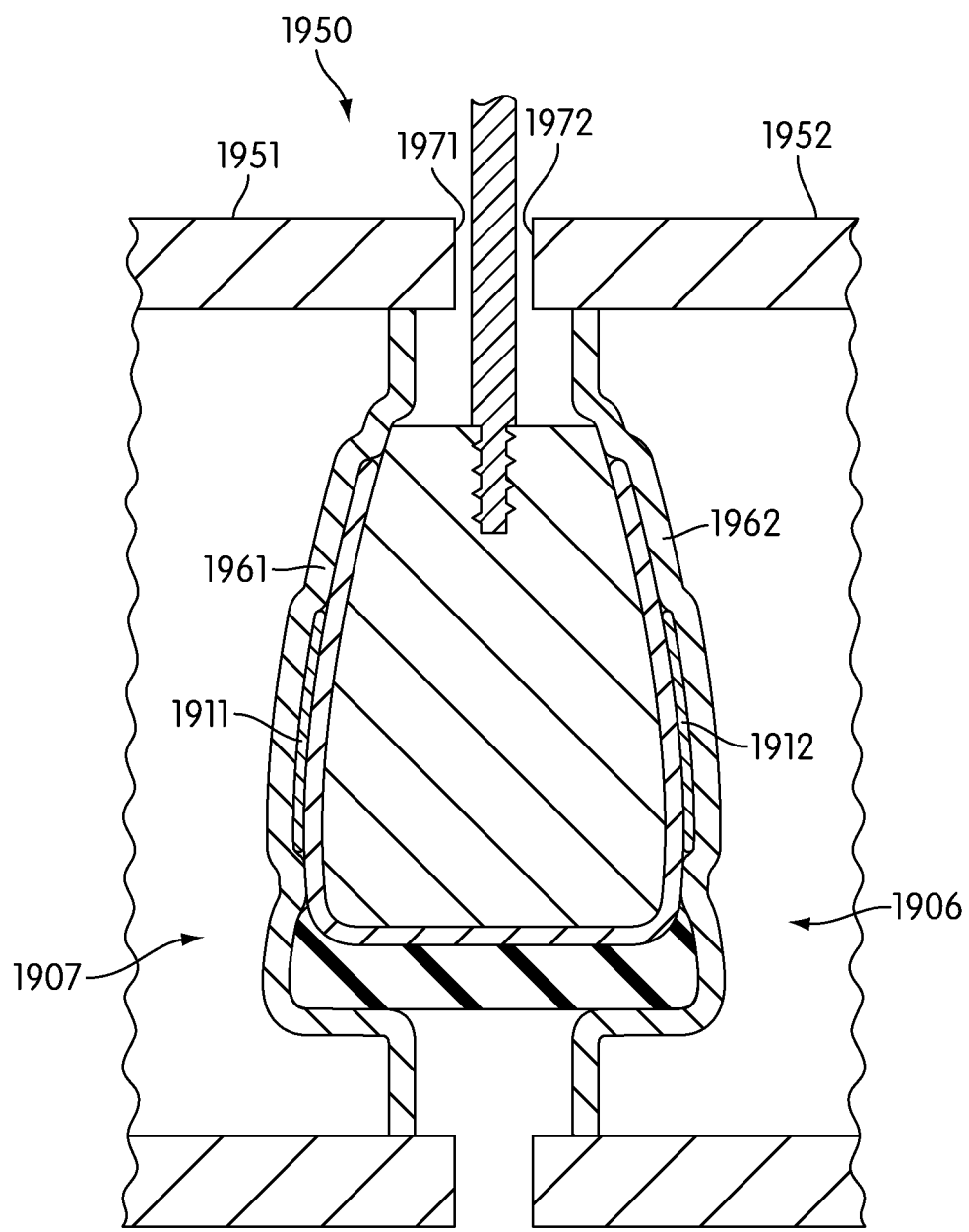
FIG. 24 is a cross sectional view of an exemplary embodiment of a graphic transfer assembly applying two graphics to two curved portions of an article.

Referring to FIGS. 23 and 24, graphic transfer assembly 1950 includes first graphic transfer assembly 1951 and second graphic transfer assembly 1952. In one embodiment, first graphic transfer assembly 1951 and second graphic transfer assembly 1952 are configured in a substantially similar manner. In some cases, first graphic transfer assembly 1951 and second graphic transfer assembly 1952 may be configured in a substantially similar manner as graphic transfer assembly 1550 of the previous embodiment.

In particular, first graphic transfer assembly 1951 includes first deformable membrane 1961. Furthermore, first graphic transfer assembly 1951 includes first chamber 1971 disposed adjacent to and surrounding first deformable membrane 1961. In addition, first graphic transfer assembly 1951 includes heating elements, not illustrated for purposes of clarity.

In a similar manner, second graphic transfer assembly 1952 includes second deformable membrane 1962. Also, second graphic transfer assembly 1951 includes second chamber 1972 disposed adjacent to and surrounding second deformable membrane 1962. In addition, second graphic transfer assembly 1952 includes heating elements, not illustrated for purposes of clarity.

In an exemplary embodiment, graphic transfer assembly 1950 applies first graphic 1911 and second graphic 1912 to article 1900. In particular, first graphic transfer assembly 1951 may apply first graphic 1911 to lateral portion 1907 of article 1900. Likewise, second graphic transfer assembly 1952 may apply second graphic 1912 to medial portion 1906 of article 1900. Medial portion 1906 and lateral portion 1907 are configured with curved portions that conform to a contour of a foot inserted within article 1900. With this arrangement, first graphic 1911 and second graphic 1912 may be associated with curved portions of article 1900.

Prior to the application of first graphic 1911 and second graphic 1912, last 1901 may be inserted within article 1900. Furthermore, last 1901 may be attached to last assembly 1940. With this arrangement, article 1900 may be disposed between first graphic transfer assembly 1951 and second graphic transfer assembly 1952. In particular, first graphic transfer assembly 1951 may be disposed adjacent to lateral portion 1907 of article 1900. Likewise, second graphic transfer assembly 1952 may be disposed adjacent to medial portion 1906 of article 1900.

Referring to FIG. 23, first graphic transfer assembly 1951 and second graphic transfer assembly 1952 may be pressed against lateral portion 1907 and medial portion 1906, respectively, of article 1900. By pressing first graphic transfer assembly 1951 and second graphic transfer assembly 1952 against article 1900, first deformable membrane 1961 and second deformable membrane 1962 may be pressed against article 1900. With this arrangement, first deformable membrane 1961 may conform to lateral portion 1907, as illustrated in FIG. 24. Similarly, second deformable membrane 1962 may conform to medial portion 1906. Furthermore, first deformable membrane 1961 and second deformable membrane 1962 may conform to a substantial entirety of article 1900. Using this configuration, graphic transfer assembly 1950 may transfer first graphic 1911 and second graphic 1912 to curved portions of article 1900 in a substantially simultaneous manner.

In embodiments where a vacuum may not be used with a graphic transfer assembly, the graphic transfer assembly may include additional provisions to conform a deformable membrane to curved portions of an article. In some embodiments, the graphic transfer assembly may be used with a pressure sensitive medium that conforms to the curvature of the article and helps a deformable membrane conform to the contours of the article. In one exemplary embodiment, a deformable membrane may be disposed between an outer portion of a graphic transfer assembly and an inner portion of the graphic transfer assembly that are configured to conform to the surface of an article when the graphic transfer assembly applies one or more graphics to the article.

Figure 25:
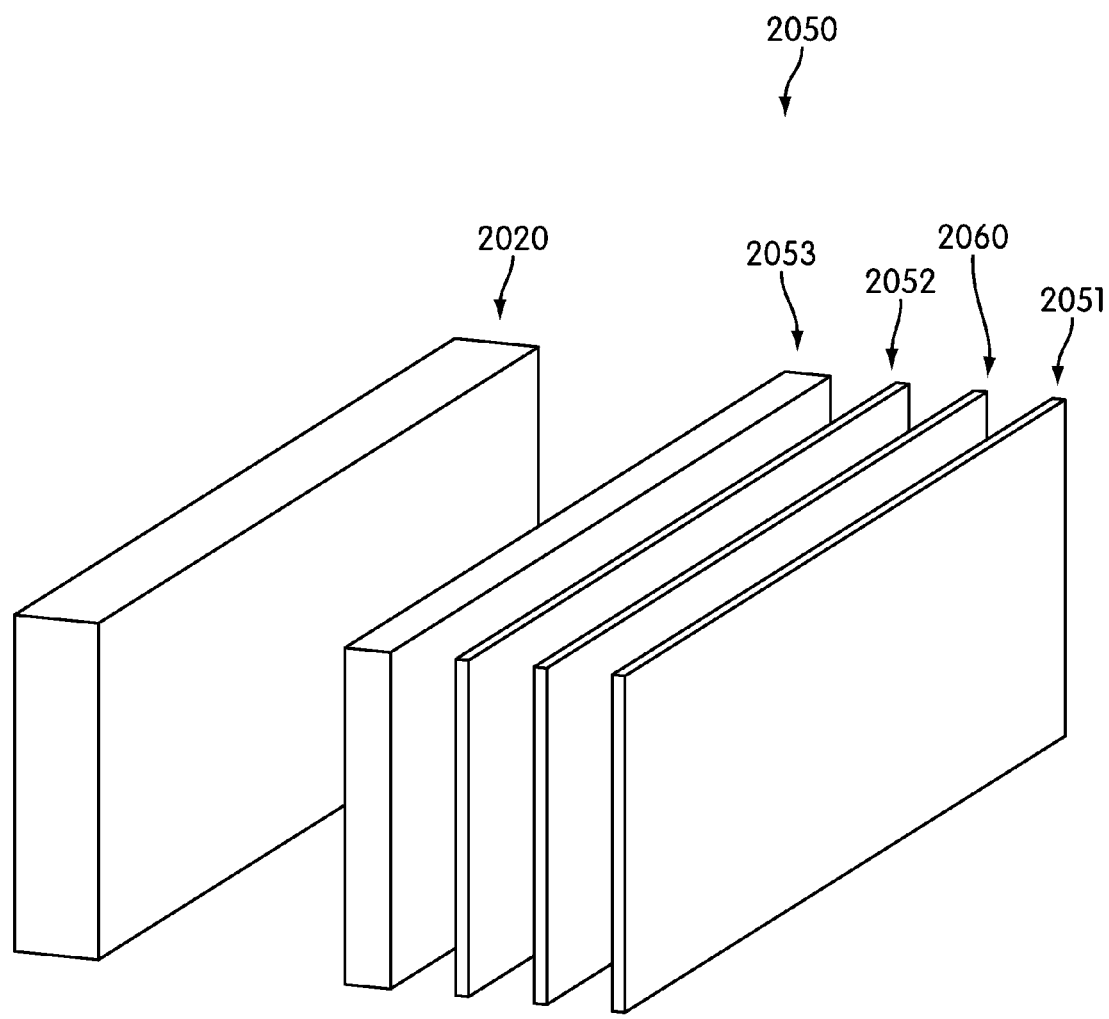
FIG. 25 is an exploded view of an exemplary embodiment of a graphic transfer assembly configured to deter attachment of a graphic to a deformable membrane.

FIG. 25 illustrates an exploded view of an exemplary embodiment of graphic transfer assembly 2050. In an exemplary embodiment, graphic transfer assembly 2050 includes deformable membrane 2060. In addition, graphic transfer assembly includes outer portion 2051. Outer portion 2051 may be disposed between deformable membrane 2060 and an article when a graphic is applied to the article.

Outer portion 2051 may be configured with various sizes and shapes, including, but not limited to: square shapes, rectangular shapes, elliptical shapes, triangular shapes, regular shapes, irregular shapes as well as other types of shapes. In some embodiments, outer portion 2051 may be configured with a substantially similar size and shape as deformable membrane 2060. In one embodiment, outer portion 2051 and deformable membrane 2060 may comprise rectangular shapes.

In some embodiments, a graphic transfer assembly may include provisions to improve heat transfer to a portion of an article. For example, in embodiments where a deformable membrane applies heat to a portion of an article, an insulating portion may be disposed adjacent to the deformable membrane in order to improve heat transfer to a portion of an article. In one embodiment, graphic transfer assembly 2050 includes insulating portion 2052. In some cases, insulating portion 2052 may be disposed adjacent to deformable membrane 2060. With this arrangement, insulating portion 2052 may improve the efficiency of heat transfer to an article.

Generally, insulating portion 2052 may be configured with any size and shape. Examples of shapes include, but are not limited to: square shapes, rectangular shapes, elliptical shapes, triangular shapes, regular shapes, irregular shapes as well as other types of shapes. In some cases, insulating portion 2052 may be configured with substantially similar size and shape as deformable membrane 2060. In an exemplary embodiment, insulating portion 2052 may be configured with a rectangular shape.

In some embodiments, graphic transfer assembly 2050 may include additional provisions to assist a deformable membrane in conforming to a curved portion of an article. In some cases, graphic transfer assembly 2050 may include inner portion 2053. Inner portion 2053 may provide additional pressure against deformable membrane 2060 when an article is pressed against outer portion 2051 and deformable membrane 2060. With this arrangement, inner portion 2053 may assist deformable membrane 2060 in conforming to a curved portion of an article.

In different embodiments, outer portion 2051 and inner portion 2053 may comprise various suitable materials. In some cases, materials suitable for outer portion 2051 and inner portion 2053 may have high temperature stability and thermo conductivity so that outer portion 2051 may transfer heat to apply a graphic to an article. Furthermore, outer portion 2051 and inner portion 2053 may also be constructed of a resilient material that may conform to a curved portion of an article. Examples of suitable materials for outer portion 2051 and inner portion 2053 include, but are not limited to: silicone, plastics, other polymers as well as other materials known in the art. In one embodiment, outer portion 2051 may be constructed of duro silicone. In addition, third portion 2053 may be constructed of silicone.

Generally, various materials may be used for insulating portion 2052. Examples of suitable materials include, but are not limited to: synthetic polymers, cotton, other natural plant materials, wool, other animal fibers, fiber-glass, other mineral wools as well as other materials. In an exemplary embodiment, insulating portion 2052 may comprise a synthetic polymer.

In different embodiments, graphic transfer assembly 2050 may be controlled in various manners. In some embodiments, an article may be pressed against outer portion 2051 to apply a graphic to the article. In other embodiments, graphic transfer assembly 2050 may include an actuator that may push portions of graphic transfer assembly 2050 against an article to apply a graphic to the article.

In an exemplary embodiment, graphic transfer assembly 2050 includes actuator 2020. Actuator 2020 may be disposed adjacent to inner portion 2053. Actuator 2020 may be configured to push inner portion 2053, insulating portion 2052, deformable membrane 2060 and outer portion 2051 against an article to apply a graphic to the article.

Figure 26:
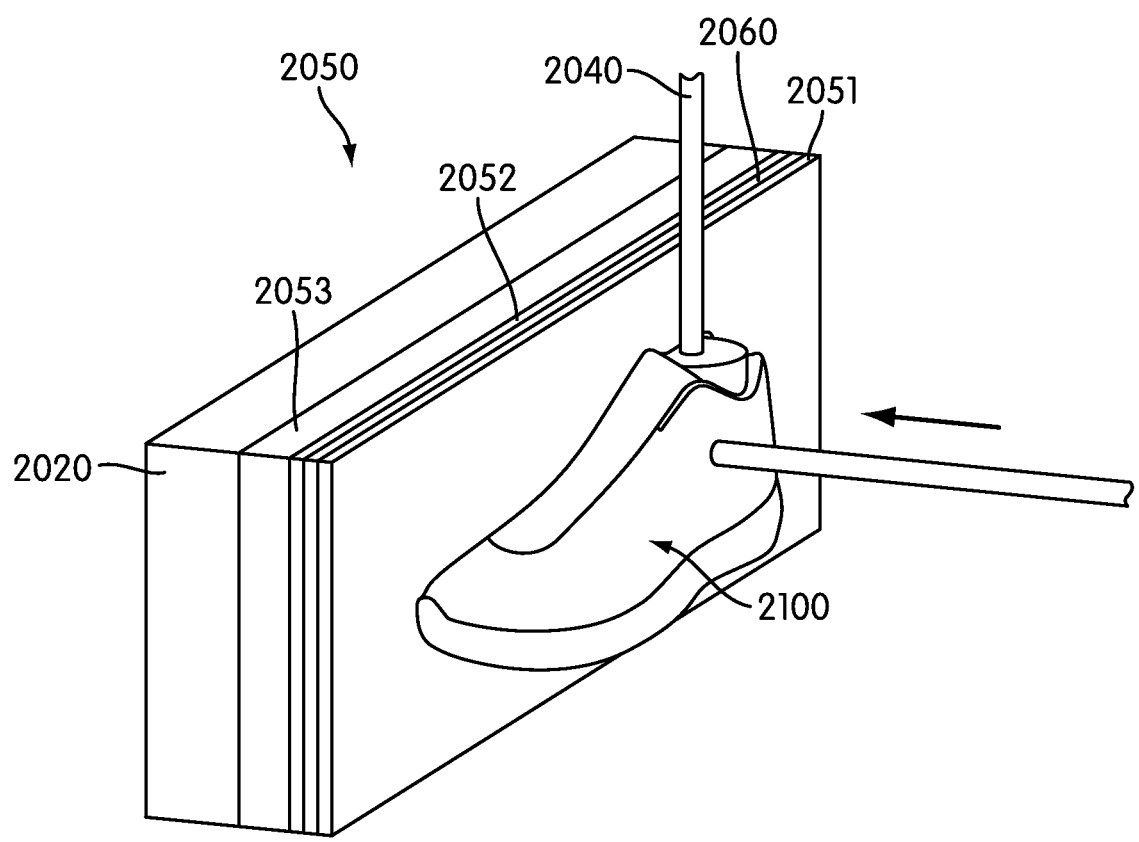
FIG. 26 is a schematic view of an embodiment of a graphic transfer assembly applying a graphic to a curved portion of an article.
Figure 27:
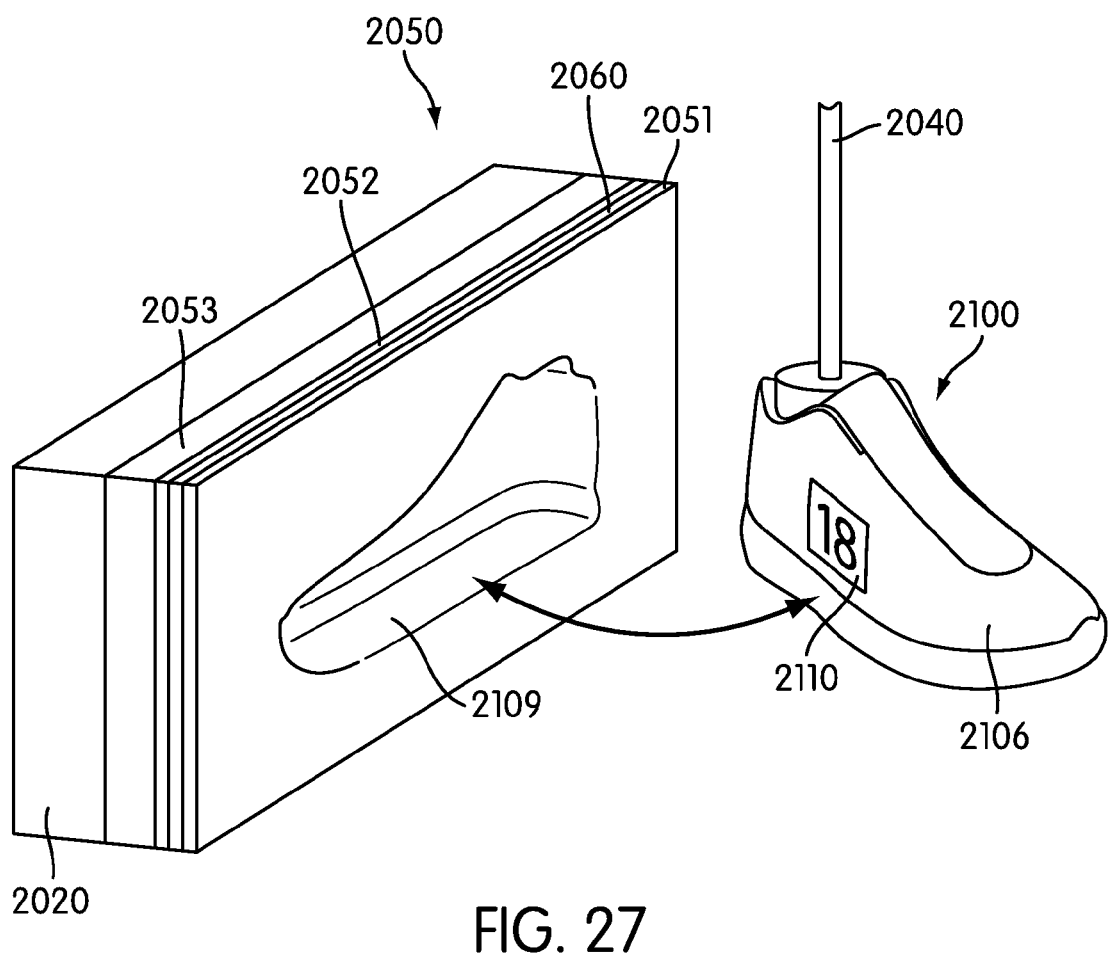
FIG. 27 is a schematic view of an embodiment of a graphic transfer assembly following the application of a graphic to an article.

FIGS. 26 and 27 illustrate an exemplary embodiment of graphic transfer assembly 2050 applying graphic 2110 to lateral portion 2106 of article 2100. Lateral portion 2106 includes curved portions configured to follow a contour of a medial portion of a foot disposed within lateral portion 2106. In other words, graphic 2110 may be associated with a curved portion of article 2100.

In one embodiment, article 2100 may be associated with a last. Furthermore, article 2100 and associated last may be attached to last assembly 2040. In particular, article 2100 may be attached to last assembly 2040 so that lateral portion 2106 is disposed adjacent to outer portion 2051.

Following the association of article 2100 with last assembly 2040, actuator 2020 may push inner portion 2053, insulating portion 2052, deformable membrane 2060 and outer portion 2051 against lateral portion 2106 of article 2100. This configuration allows inner portion 2053, insulating portion 2052, deformable membrane 2060 and outer portion 2051 to conform to lateral portion 2106 of article 2100. By conforming to lateral portion 2106, outer portion 2051 may transfer heat from deformable membrane 2060 to apply graphic 2110 to article 2100.

After graphic 2110 is applied to article 2100, actuator 2020 may pull inner portion 2053, insulating portion 2052, deformable membrane 2060 and outer portion 2051 away from article 2100. Article 2100 may be removed from the last. With this arrangement, graphic transfer assembly 2050 may apply graphic 2110 to article 2100.

In some cases, indentation 2109 may be evident in outer portion 2051 following the removal of article 2100 from outer portion 2051. Indentation 2109 in outer portion 2051 may indicate the conformation of outer portion 2051 as well as other portions of graphic transfer assembly 2050 to article 2100. Indentation 2109 may remain for a time following the removal of article 2100.

Figure 28:
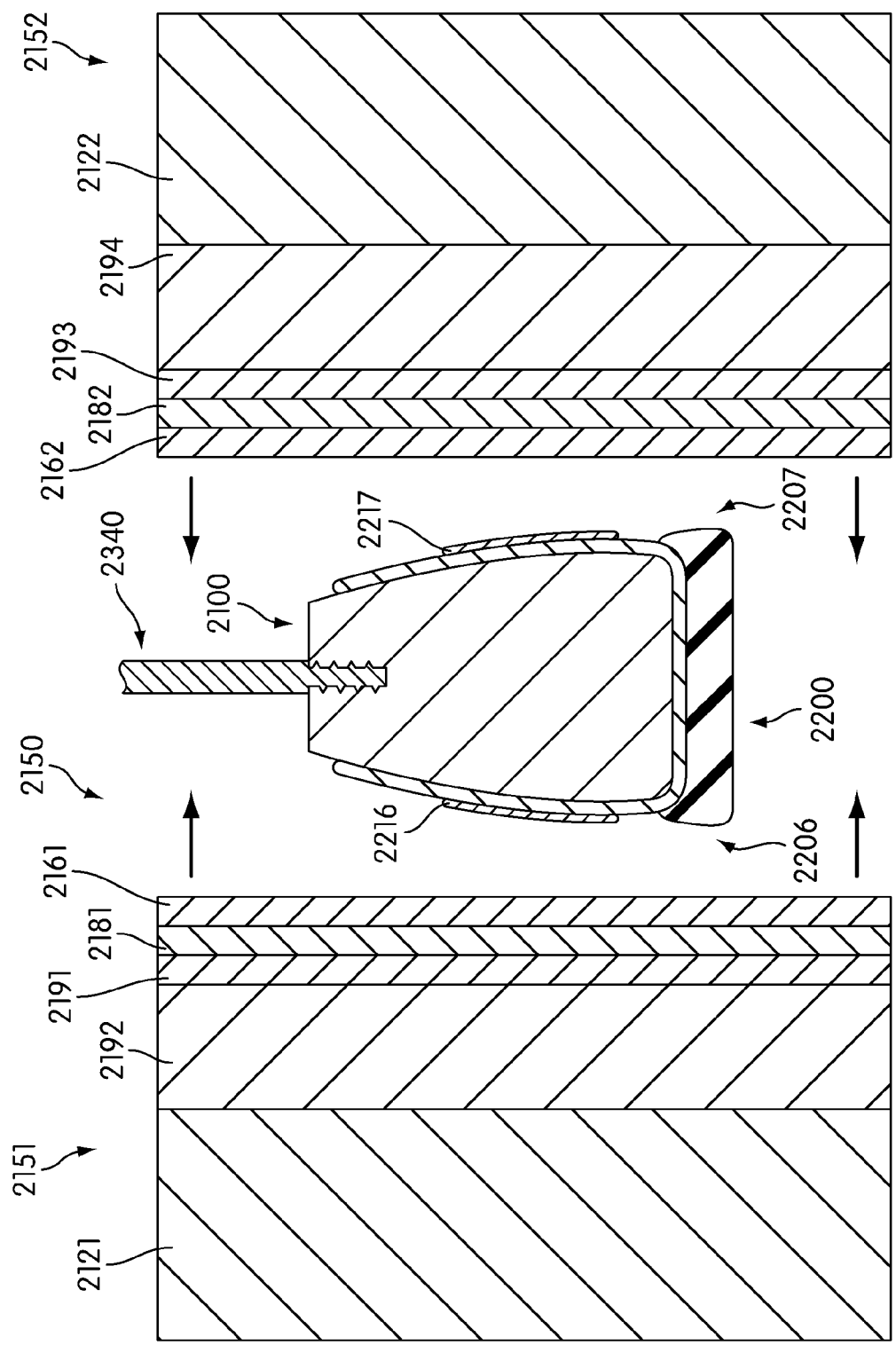
FIG. 28 is a cross sectional view of an embodiment of a graphic transfer assembly configured to apply two graphics to two curved portions of an article.
Figure 29:
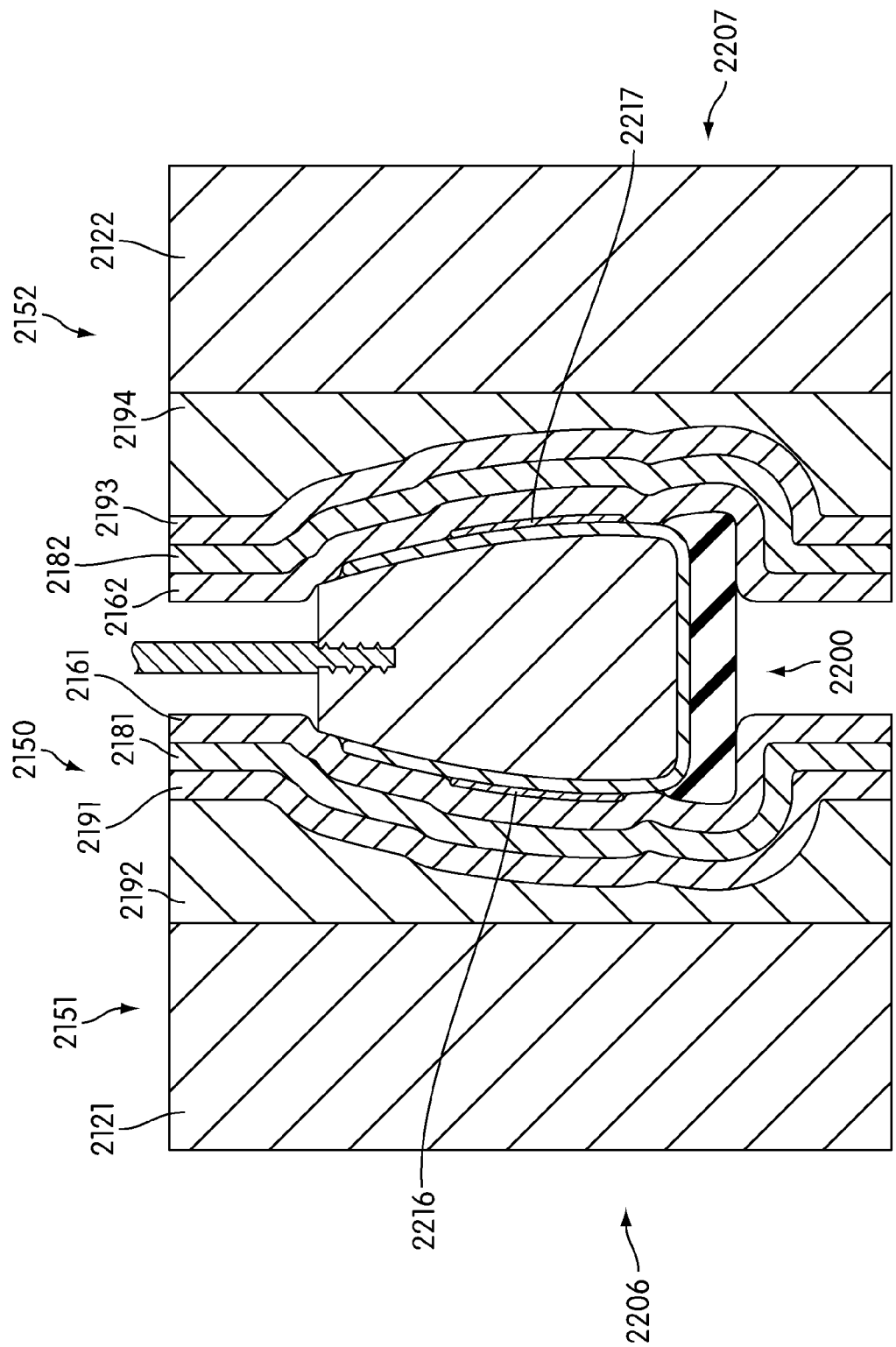
FIG. 29 is a cross sectional view of an embodiment of a graphic transfer assembly applying two graphics to two curved portions of an article.

As previously discussed, a graphic transfer assembly may be configured with more than one graphic transfer assembly to apply graphics to different portions of an article in a substantially simultaneous manner. Referring to FIGS. 28 and 29, graphic transfer assembly 2150 includes first graphic transfer assembly 2151 and second graphic transfer assembly 2152.

In an exemplary embodiment, first graphic transfer assembly 2151 and second graphic transfer assembly 2152 are configured in a substantially similar manner. In some cases, first graphic transfer assembly 2151 and second graphic transfer assembly 2152 may be configured in a substantially similar manner as graphic transfer assembly 2050 of the previous embodiment. For example, first graphic transfer assembly 2151 includes first outer portion 2161 disposed adjacent to first deformable membrane 2181. Also, first graphic transfer assembly 2151 includes first insulating portion 2191 disposed adjacent to first deformable membrane 2181. Additionally, first graphic transfer assembly 2151 includes first inner portion 2192 disposed between first insulating portion 2191 and first actuator 2121.

In a similar manner, second graphic transfer assembly 2152 includes second outer portion 2162 disposed between second deformable membrane 2182 and an article. In addition, second graphic transfer assembly 2152 includes second insulating portion 2193 disposed adjacent to second deformable membrane 2182. Also, second graphic transfer assembly 2152 includes second inner portion 2194 disposed between second insulating portion 2193 and second actuator 2122.

In an exemplary embodiment, graphic transfer assembly 2150 applies first graphic 2216 and second graphic 2217 to article 2200. In particular, first graphic transfer assembly 2151 may apply first graphic 2216 to medial portion 2206 of article 2200. In addition, second graphic transfer assembly 2152 may apply second graphic 2217 to lateral portion 2207 of article 2200.

Before applying first graphic 2216 and second graphic 2217, a last may be inserted within article 2200. Furthermore, the last may be attached to last assembly 2340. With this arrangement, article 2200 may be disposed between first graphic transfer assembly 2151 and second graphic transfer assembly 2152. In particular, first graphic transfer assembly 2151 may be disposed adjacent to medial portion 2206. Likewise, second graphic transfer assembly 2152 may be disposed adjacent to lateral portion 2207.

Referring to FIG. 28, first actuator 2121 may press first inner portion 2192, first insulating portion 2191, first deformable membrane 2181 and first outer portion 2161 against medial portion 2206 of article 2200. Similarly, second actuator 2122 may press second inner portion 2194, second insulating portion 2193, second deformable membrane 2182 and second outer portion 2162 against lateral portion 2207 of article 2200. With this arrangement, first inner portion 2192, first insulating portion 2191, first deformable membrane 2181 and first outer portion 2161 may conform to medial portion 2206, as illustrated in FIG. 29. Similarly, second inner portion 2194, second insulating portion 2193, second deformable membrane 2182 and second outer portion 2162 may conform to lateral portion 2207. Using this configuration, graphic transfer assembly 2150 may transfer first graphic 2216 and second graphic 2217 to article 2200.

In different embodiments, any layer of graphic transfer assembly 2150 can be used to provide heat to one or more graphics. In some cases, first outer portion 2161 and second outer portion 2162 can be heated directly by a thermal source. In other cases, first deformable membrane 2181 and second deformable membrane 2182 can be heated directly by a thermal source. In still other cases, first insulating portion 2191 and second insulating portion 2192 can be heated directly by a thermal source. In still other embodiments, other portions of graphic transfer assembly 2150 can be heated. In an exemplary embodiment, first outer portion 2161 and second outer portion 2162 may be heated layers. Furthermore, these layers can be heated using any known method in the art. For example, in some cases, the layers can be heated using wires or other conductors configured to produce heat. These heated wires can be disposed on the surface of a layer, or embedded within a layer.

With this method, a graphic transfer assembly may apply graphics to curved portions of various articles. In particular, a last assembly provides interchangeability by allowing various types of articles to be attached to the graphic transfer assembly. In addition, a deformable membrane associated with the graphic transfer assembly may be adapted to conform to curved portions of various articles. With this configuration, graphics may be applied to articles without a molding process. This allows graphics to be applied to post-production articles.

A graphic transfer assembly can include provisions for protecting a sole or tooling of an article of footwear. In some cases, heating during the transfer process can contribute to degradation or deformation of a sole of an article. In an exemplary embodiment, a protective member can be used to cover the sole to prevent unwanted heating of the sole.

Figure 30:
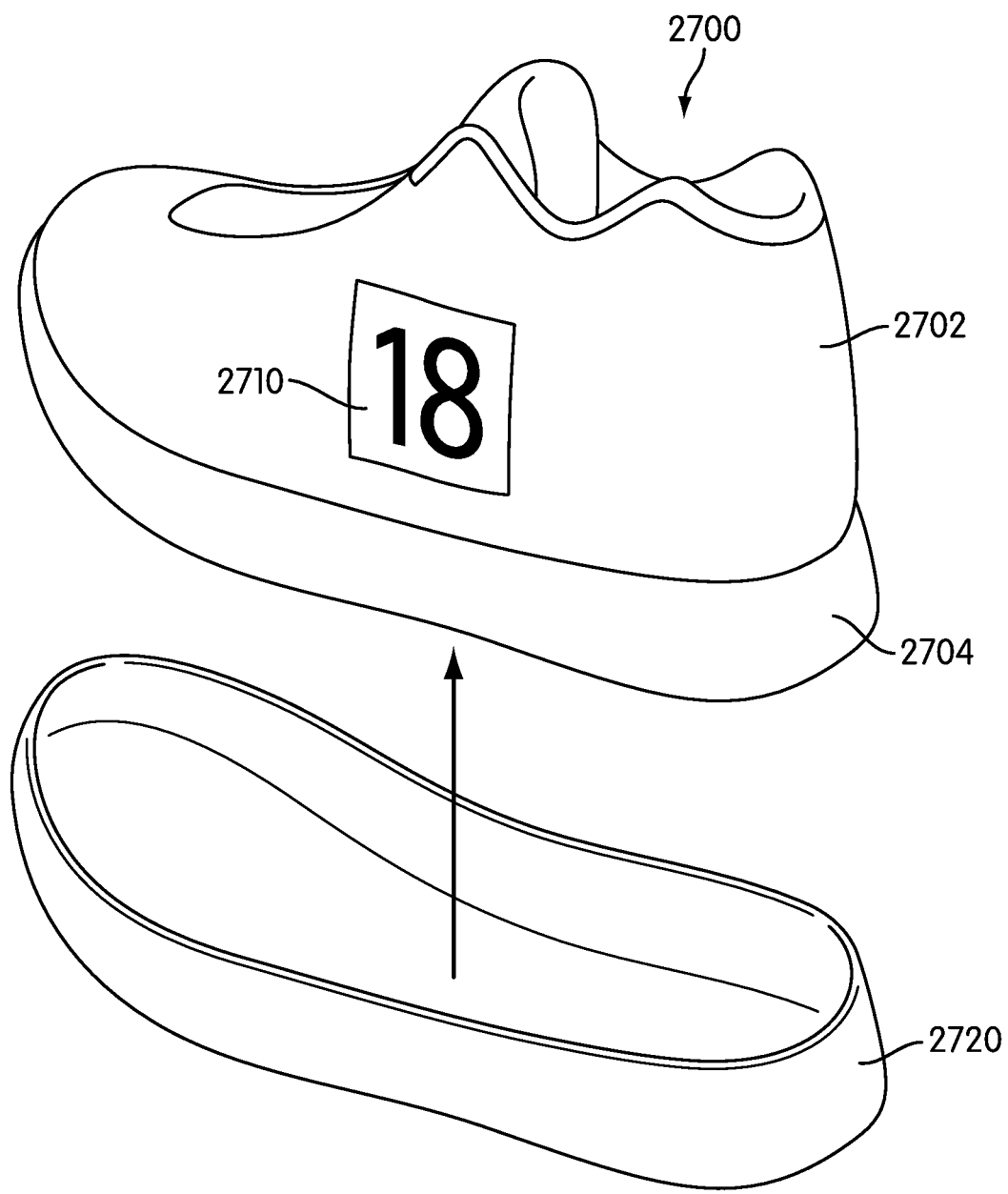
FIG. 30 is an isometric exploded view of an exemplary embodiment of an article of footwear and a protective member.

Referring to FIG. 30, article 2700 includes upper 2702 and sole 2704. At this point, first graphic 2710 and second graphic 2712 (see FIG. 31) may be associated with upper 2702. Prior to associating article 2700 with a graphic transfer assembly, sole 2704 may be covered using protective member 2720. In one embodiment, protective member 2720 can be shaped to receive sole 2704. Furthermore, protective member 2720 can be made of a material that has low thermal conductivity.

Figure 31:
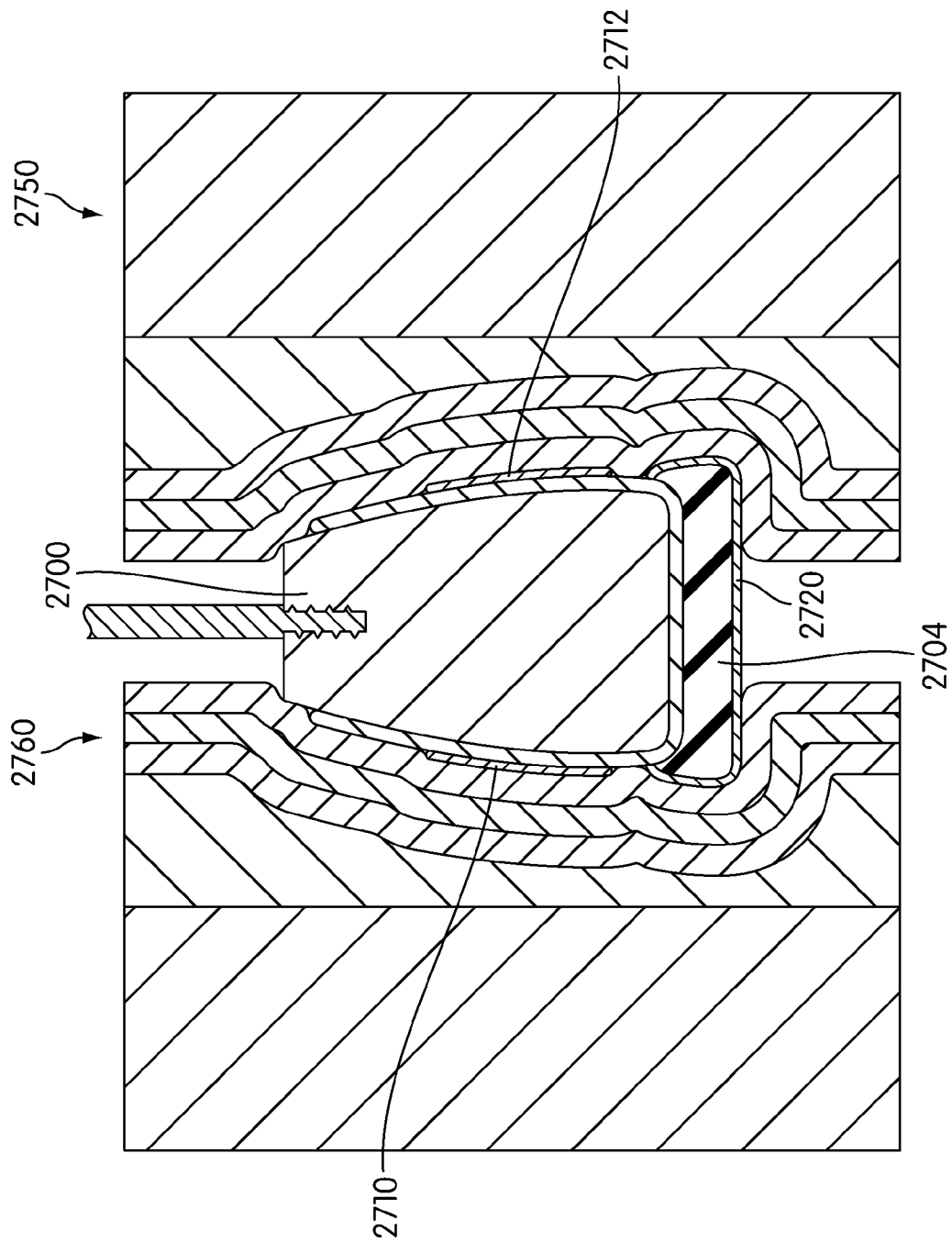
FIG. 31 is an isometric view of an exemplary embodiment of an article of footwear and a protective member.

Referring to FIG. 31, article 2700 may be exposed to graphic transfer assembly 2750 to transfer first graphic 2710 and second graphic 2712 to one or more curved portions of article 2700. In some cases, graphic transfer assembly 2750 may be substantially similar to graphic assembly 2150 of the previous embodiment. At this point, one or more of plurality of layers 2760 of graphic transfer assembly 2750 may conform to the shape of article 2700. Furthermore, one or more of plurality of layers 2760 may be heated to facilitate transfer of first graphic 2710 and second graphic 2712. By using protective member 2720, sole 2704 may be protected from the heat generated by graphic transfer assembly 2750 during the transfer process.

Figure 32:
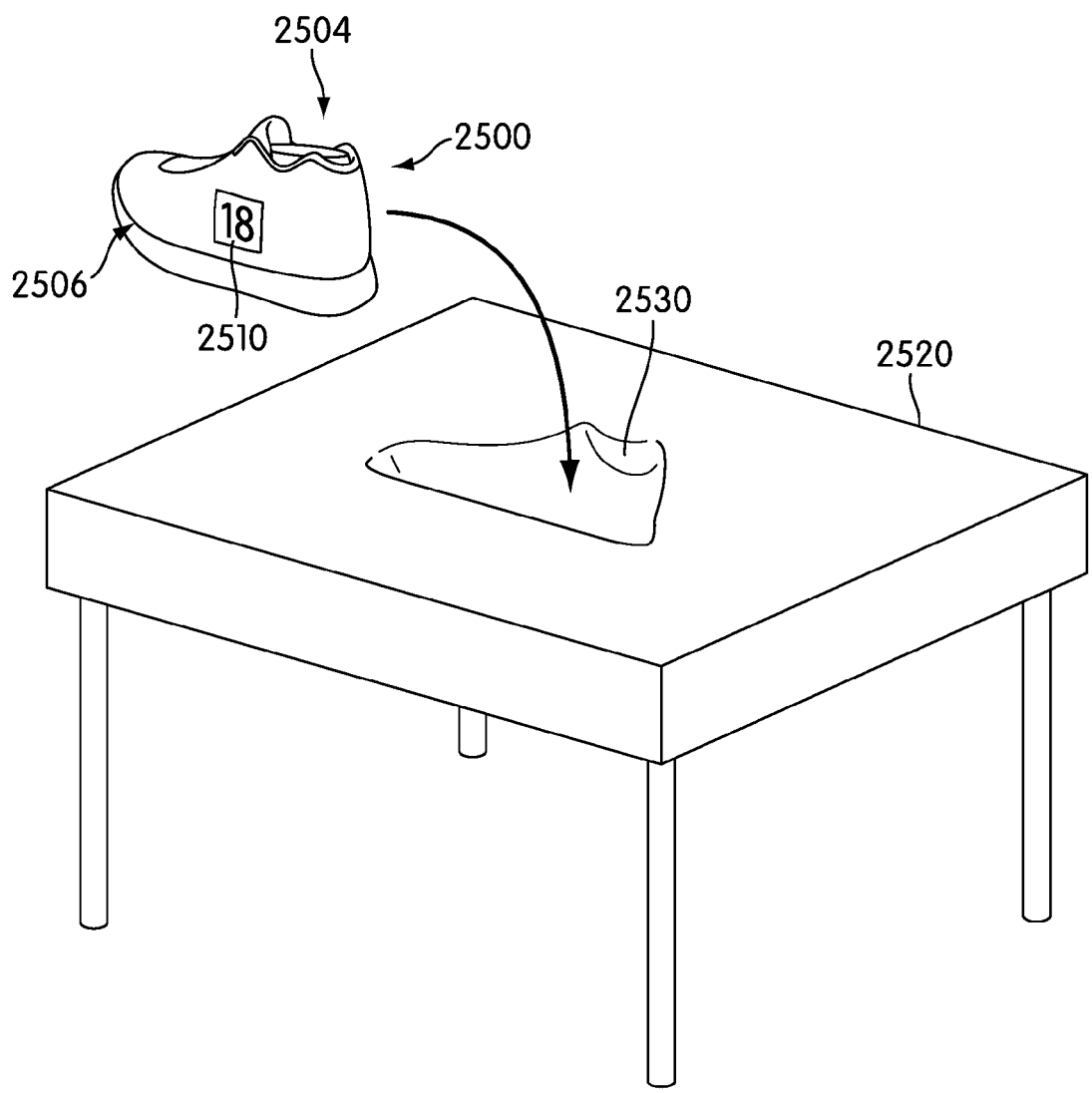
FIG. 32 is an isometric view of an exemplary embodiment of a graphic transfer assembly.

A graphic transfer assembly can include provisions to facilitate easy of use for a graphic transfer process. FIGS. 32 through 35 illustrate another embodiment of a graphic transfer assembly. Referring to FIG. 32, article 2500 includes graphic 2510 disposed on lateral portion 2506. In some cases a graphic transfer assembly for article 2500 can include base portion 2520. In one embodiment, base portion 2520 may be a table or counter.

Base portion 2520 may include provisions for receiving article 2500. In some cases, base portion 2520 may include cavity 2530. In different embodiments, cavity 2530 can have any shape. In this exemplary embodiment, cavity 2530 can be shaped to receive medial portion 2504 of article 2500.

Figure 33:
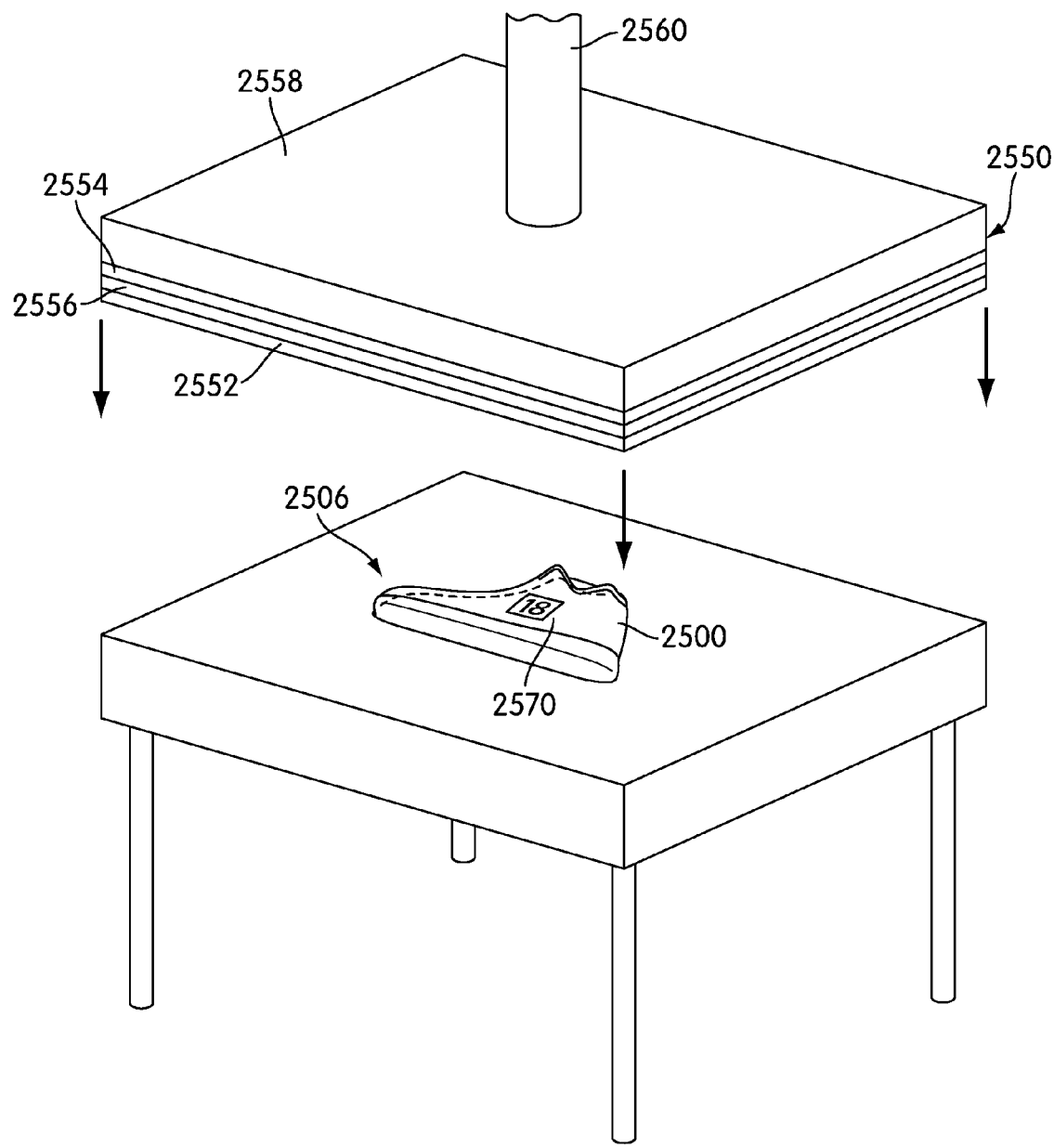
FIG. 33 is an isometric view of an exemplary embodiment of a graphic transfer assembly.

Referring to FIG. 33, medial portion 2504 of article 2500 has been inserted into cavity 2530. This arrangement exposes lateral portion 2506, including graphic 2510, in a generally upwards direction.

Graphic transfer assembly 2500 may further include moving portion 2550. In some cases, moving portion 2550 may include several layers. In one embodiment, moving portion 2550 may comprise outer layer 2552, inner layer 2554 and intermediate layer 2556. Furthermore, moving portion 2550 can include rigid layer 2558. Finally, in some cases, moving portion 2550 can include actuating member 2560. In some cases, actuating member 2560 may be a rod. In other cases, actuating member 2560 can be any structure configured to facilitate movement for moving portion 2550.

In some embodiments, outer layer 2552 can be configured to conform to curved portion 2570 of article 2500. In some cases, outer layer 2552 can be made of a material including a soft silicone. In other cases, outer layer 2552 can be made of another relatively soft material that is capable of deforming to curved portion 2570 of article 2500. Additionally, inner layer 2554 can be made of a partially deforming material. In some cases, inner layer 2554 can be made of a material including silicone. In still other embodiments, inner layer 2554 can be made of another deforming material.

In some embodiments, intermediate layer 2556 can be made of a deformable membrane. In particular, intermediate layer 2556 can be made of a material such as rubber. In other cases, intermediate layer 2556 can be any other type of deformable membrane that has been previously discussed or which is known in the art.

As previously discussed, any layer of moving portion 2550 can include heating provisions. In some cases, outer layer 2552 can be a heating layer. In other cases, inner layer 2554 can be a heating layer. In still other cases, intermediate layer 2556 can be a heating layer. In still other cases, more than one of these layers can be a heating layer.

Figure 34:
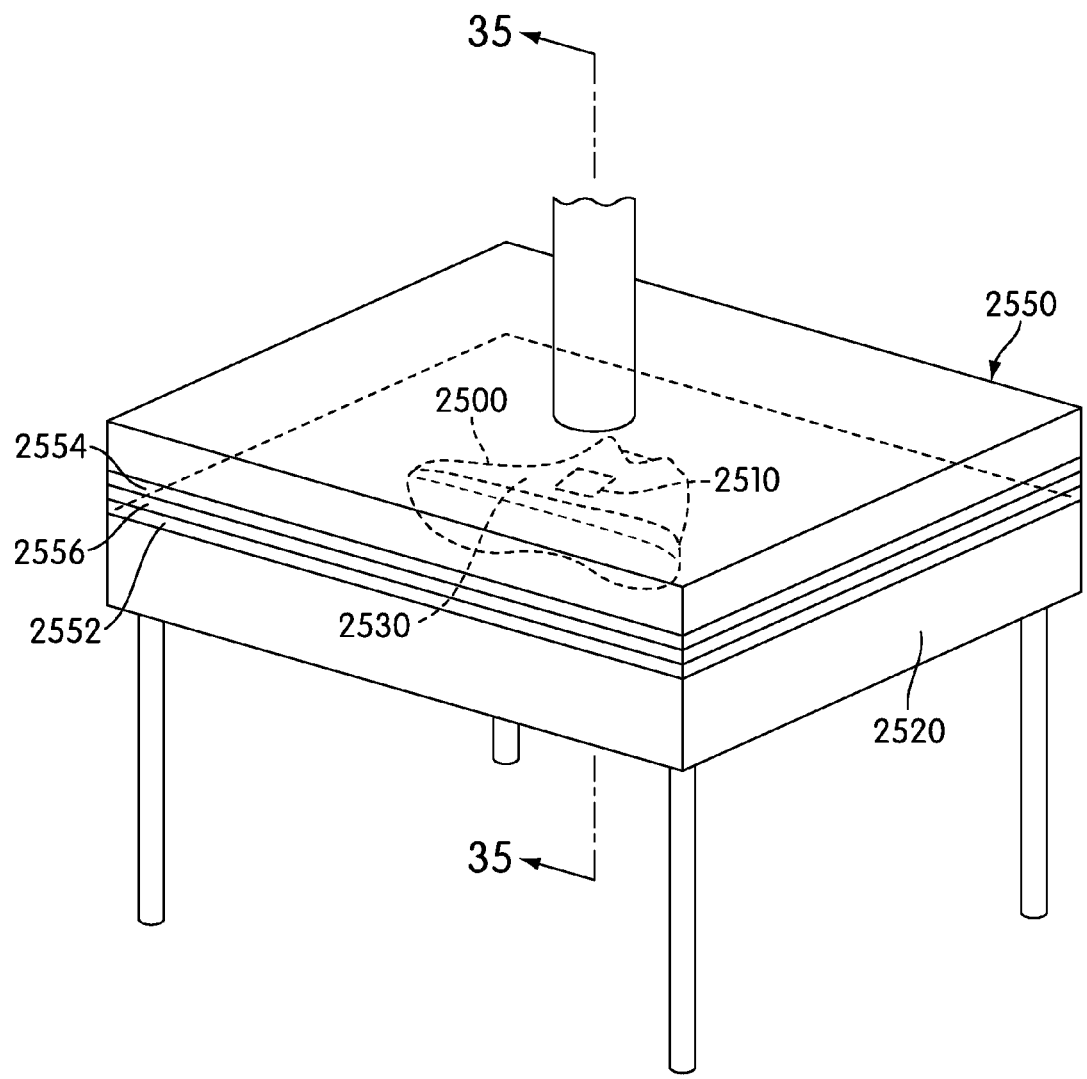
FIG. 34 is an isometric view of an exemplary embodiment of a graphic transfer assembly.
Figure 35:
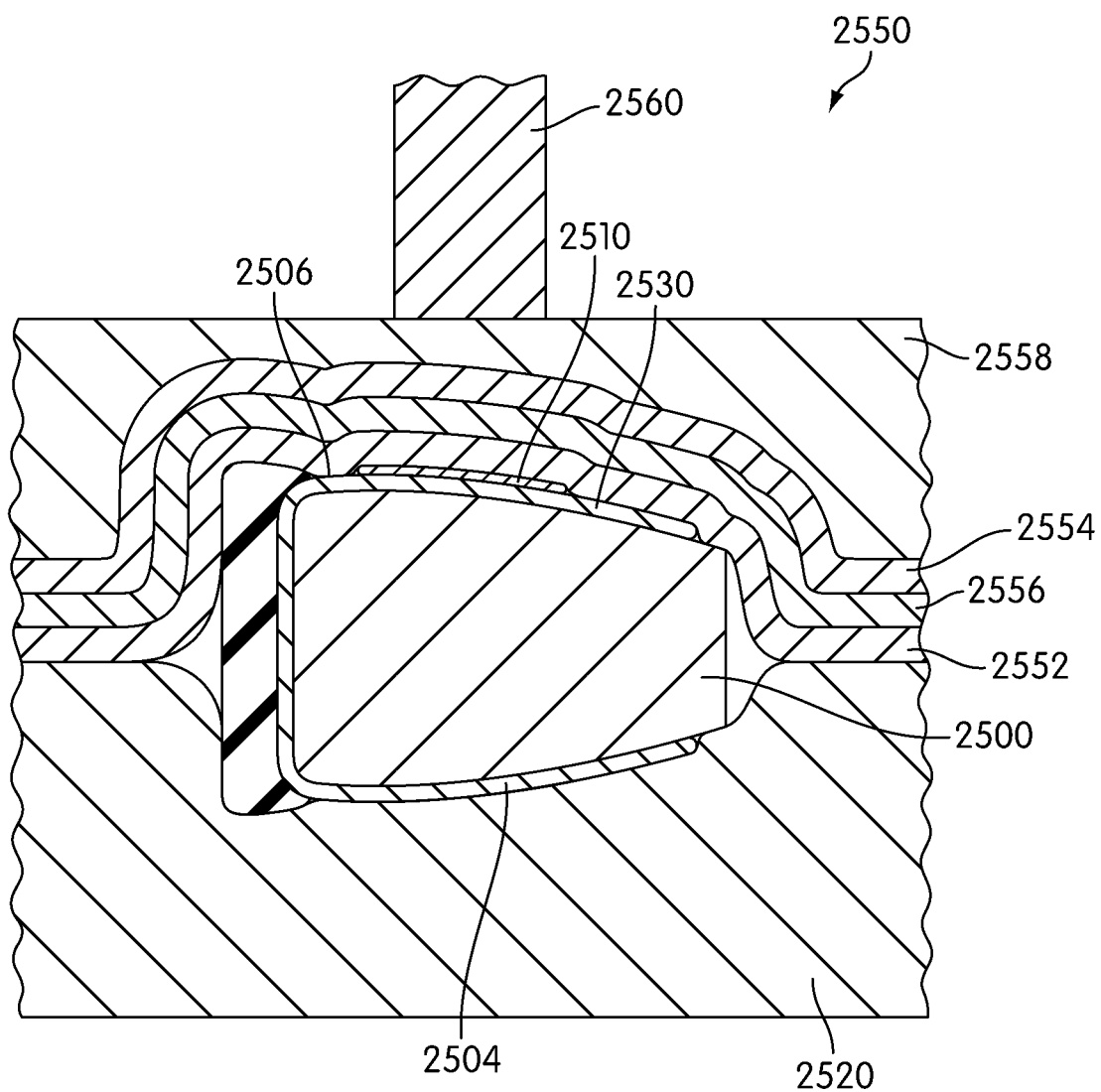
FIG. 35 is a cross sectional view of an exemplary embodiment of a graphic transfer assembly.

Referring to FIGS. 34-35, moving portion 2550 can be pressed against base portion 2520, using actuating member 2560. As moving portion 2550 is pressed against base portion 2520, moving portion 2550 may apply pressure to curved portion 2530 of article 2500. In particular, outer layer 2552, inner layer 2554 and intermediate layer 2556 may deform against the contours of curved portion 2530. This arrangement allows graphic 2510 to be applied to curved portion 2530. In particular, as one or more layers of moving portion 2550 are heated, graphic 2510 will be transferred to curved portion B2530 in the manner previously discussed.

In some cases, the embodiment discussed here can be easily adapted to a large scale manufacturing process. In particular, articles of footwear including an associated graphic can quickly be inserted into pre-formed cavities of a table, counter, or other working surface. Furthermore, using a press-type arrangement allows for quick and easy application of deformable layers to a curved portion of the article of footwear.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A graphic transfer assembly, comprising:
a deformable membrane;
a housing portion, the housing portion including at least one heating element;
a chamber disposed adjacent to the deformable membrane, wherein the chamber is attached to the housing portion;
wherein the chamber is filled with a liquid to provide heat conduction between the at least one heating element and the deformable membrane;

a last assembly, the last assembly including a last configured to hold an article; and wherein the graphic transfer assembly is configured to press at least a portion of the article against the deformable membrane and thereby transfer a graphic to the portion of the article.

2. The graphic transfer assembly according to claim 1, wherein the last assembly moves to push a curved portion of the article against the deformable membrane; and wherein the deformable membrane conforms to the curved portion of the article.

3. The graphic transfer assembly according to claim 1, wherein the chamber further comprises a cut out portion.

4. The graphic transfer assembly according to claim 3, wherein an outer periphery of the deformable membrane is attached to the cut out portion of the chamber.

5. The graphic transfer assembly according to claim 1, wherein the liquid is oil.

6. The graphic transfer assembly according to claim 1, further comprising:

a first graphic transfer assembly including a first deformable membrane, a first housing portion including a first heating element, and a first chamber disposed adjacent to the first deformable membrane, wherein the first chamber is attached to the first housing portion;

a second graphic transfer assembly including a second deformable membrane, a second housing portion including a second heating element, and a second chamber disposed adjacent to the second deformable membrane, wherein the second chamber is attached to the second housing portion; and wherein the last assembly, disposed between the first graphic transfer assembly and the second graphic transfer assembly is configured to hold a last having the article disposed thereon between the first graphic transfer assembly and the second graphic transfer assembly.

7. A graphic transfer assembly, comprising:

a deformable membrane;

an actuator, wherein the actuator is configured to move the graphic transfer assembly;

a pressure sensitive medium, wherein the pressure sensitive medium conforms to a shape of an article;

wherein the pressure sensitive medium and the deformable membrane are conductively heated by a thermal source;

wherein the pressure sensitive medium comprises at least an inner portion disposed between the actuator and the deformable membrane and an outer portion disposed between the deformable membrane and an article; and wherein the actuator is configured to move the graphic transfer assembly to press at least a portion of the article against the deformable membrane and the pressure sensitive medium, thereby transferring a graphic to the portion of the article.

8. The graphic transfer assembly according to claim 7, wherein the pressure sensitive medium further comprises an insulating portion.

9. The graphic transfer assembly according to claim 8, wherein the insulating portion is disposed between the inner portion of the pressure sensitive medium and the deformable membrane.

10. The graphic transfer assembly according to claim 7, wherein an indentation corresponding to the portion of the article remains in the outer portion of the pressure sensitive medium for a period of time following removal of the article from being in contact with the pressure sensitive medium.

11. The graphic transfer assembly according to claim 7, further comprising:

a first graphic transfer assembly including a first deformable membrane, a first outer portion disposed adjacent to the first deformable medium, a first actuator, and a first inner portion disposed between the first actuator and the first deformable membrane;

a second graphic transfer assembly including a second deformable membrane, a second outer portion disposed adjacent to the second deformable medium, a second actuator, and a second inner portion disposed between the second actuator and the second deformable membrane; and wherein a last assembly disposed between the first graphic transfer assembly and the second graphic transfer assembly, is configured to hold a last having the article disposed thereon between the first graphic transfer assembly and the second graphic transfer assembly.

12. The graphic transfer assembly according to claim 11, wherein the first graphic transfer assembly further includes a first insulating portion disposed between the first inner portion and the first deformable membrane; and wherein the second graphic transfer assembly further includes a second insulating portion disposed between the second inner portion and the second deformable membrane.

13. The graphic transfer assembly according to claim 12, wherein at least one of the first outer portion, the first insulating portion, and the first deformable membrane of the first graphic transfer assembly are heated by a first thermal source; and wherein at least one of the second outer portion, the second insulating portion, and the second deformable membrane of the second graphic transfer assembly are heated by a second thermal source.

14. The graphic transfer assembly according to claim 13, wherein at least one of the first thermal source and the second thermal source comprises heated wires.

15. A graphic transfer assembly, comprising:

a base portion, wherein the base portion further comprises a cavity that corresponds to the shape of an article;

a moving portion, wherein the moving portion comprises a plurality of deformable layers and a rigid layer;

an actuating member configured to move the moving portion, wherein the actuating member is attached to the rigid layer of the moving portion;

wherein the plurality of deformable layers includes an outer layer;

wherein the plurality of deformable layers includes a conductive heating layer; and wherein the actuating member is configured to move the moving portion towards the base portion to press at least a portion of an article disposed on the base portion against the outer layer, thereby transferring a graphic to the portion of the article.

16. The graphic transfer assembly according to claim 15, wherein the outer layer is made from soft silicone.

17. The graphic transfer assembly according to claim 15, wherein the actuating member is a rod.

18. The graphic transfer assembly according to claim 15, wherein the cavity is configured to hold the article in place on the base portion such that the portion of the article including the graphic is disposed facing towards the outer layer of the moving portion.

19. The graphic transfer assembly according to claim 15, wherein the plurality of deformable layers further includes an inner layer disposed adjacent to the rigid layer and an intermediate layer disposed between the inner layer and the outer layer.

20. The graphic transfer assembly according to claim 19, wherein at least one of the inner layer, the intermediate layer, and the outer layer is a heating layer.

\* \* \* \* \*